United States Patent
Currivan et al.

(10) Patent No.: US 9,596,041 B2
(45) Date of Patent: Mar. 14, 2017

(54) NOISE LOCALIZATION WITHIN CABLE BASED COMMUNICATION SYSTEMS

(71) Applicant: BROADCOM CORPORATION, Irvine, CA (US)

(72) Inventors: Bruce Joseph Currivan, Los Altos, CA (US); Richard Stephen Prodan, Niwot, CO (US); Leo Montreuil, Atlanta, GA (US); Thomas Joseph Kolze, Phoenix, AZ (US); Ramon Alejandro Gomez, San Juan Capistrano, CA (US); Jonathan Sooki Min, Newport Coast, CA (US); Fang Lu, Rowland Heights, CA (US); Donald George McMullin, Laguna Hills, CA (US); Kevin Lee Miller, Lawrenceville, GA (US); Peter Cangiane, Hermosa Beach, CA (US); Mark Edward Laubach, Redwood City, CA (US)

(73) Assignee: BROADCOM CORPORATION, Irvine, CA (US)

(*) Notice: Subject to any disclaimer, the term of this patent is extended or adjusted under 35 U.S.C. 154(b) by 0 days.

(21) Appl. No.: 14/800,177

(22) Filed: Jul. 15, 2015

(65) Prior Publication Data
US 2016/0028496 A1    Jan. 28, 2016

Related U.S. Application Data

(60) Provisional application No. 62/030,041, filed on Jul. 28, 2014, provisional application No. 62/112,093, (Continued)

(51) Int. Cl.
*H04L 5/16* (2006.01)
*H04B 17/18* (2015.01)
(Continued)

(52) U.S. Cl.
CPC ......... *H04B 17/18* (2015.01); *H04B 17/0085* (2013.01); *H04B 17/15* (2015.01); (Continued)

(58) Field of Classification Search
CPC .................. H04L 12/2898; H04L 12/2801
(Continued)

(56) References Cited

U.S. PATENT DOCUMENTS 7,203,227 B1 * 4/2007 Currivan ............ H04L 12/2801
                                                          375/222
2004/0190544 A1 * 9/2004 Azenko .................. H04L 43/18
                                                          370/442
(Continued)

FOREIGN PATENT DOCUMENTS

EP    1341335 B1    9/2015
WO   0189130 A2   11/2001

OTHER PUBLICATIONS

European Patent Office; European Search Report; EP Application No. 15002187.1; Dec. 15, 2015; 4 pgs.

*Primary Examiner* — Daniel Washburn
*Assistant Examiner* — Fitwi Hailegiorgis
(74) *Attorney, Agent, or Firm* — Garlick & Markison; Shayne X. Short

(57) ABSTRACT

A communication device (e.g., a cable modem (CM)) includes a digital to analog converter (DAC) and a power amplifier (PA) that generate a signal to be transmitting via a communication interface to another communication device (e.g., cable modem termination system (CMTS)). The CM includes diagnostic analyzer that samples the signal based on a fullband sample capture corresponding to a full bandwidth and/or a subset (e.g., narrowband) sample capture to generate a fullband and/or subset signal capture (e.g., of an upstream (US) communication channel between the CM and (Continued)

the CMTS). The diagnostic analyzer can be configured to generate sample captures of the signal based on any desired parameter(s), condition(s), and/or trigger(s). The CM then transmits the signal to the CMTS and the fullband and/or subset signal capture to the CMTS and/or a proactive network maintenance (PNM) communication device to determine at least one characteristic associated with performance of the US communication channel.

20 Claims, 9 Drawing Sheets

Related U.S. Application Data filed on Feb. 4, 2015, provisional application No. 62/157,770, filed on May 6, 2015.

(51) Int. Cl.

| | |
|---|---|
| H04L 5/00 | (2006.01) |
| H04B 17/345 | (2015.01) |
| H04L 1/20 | (2006.01) |
| H04L 1/24 | (2006.01) |
| H04B 17/15 | (2015.01) |
| H04B 17/00 | (2015.01) |
| H04B 17/26 | (2015.01) |
| H04B 17/29 | (2015.01) |
| H04L 12/64 | (2006.01) |
| H04B 3/46 | (2015.01) |

(52) U.S. Cl.
CPC ............. *H04B 17/26* (2015.01); *H04B 17/29* (2015.01); *H04B 17/345* (2015.01); *H04L 1/20* (2013.01); *H04L 1/24* (2013.01); *H04L 5/0007* (2013.01); *H04B 3/46* (2013.01); *H04L 2012/6421* (2013.01)

(58) Field of Classification Search
USPC .......................... 375/222; 370/442; 725/111
See application file for complete search history.

(56) References Cited

U.S. PATENT DOCUMENTS

| | | | |
|---|---|---|---|
| 2010/0131999 A1* | 5/2010 | Kfir | ..................... H04L 12/2801 725/111 |
| 2010/0309805 A1 | 12/2010 | Jones, Jr. et al. | |
| 2014/0010269 A1 | 1/2014 | Ling et al. | |

\* cited by examiner

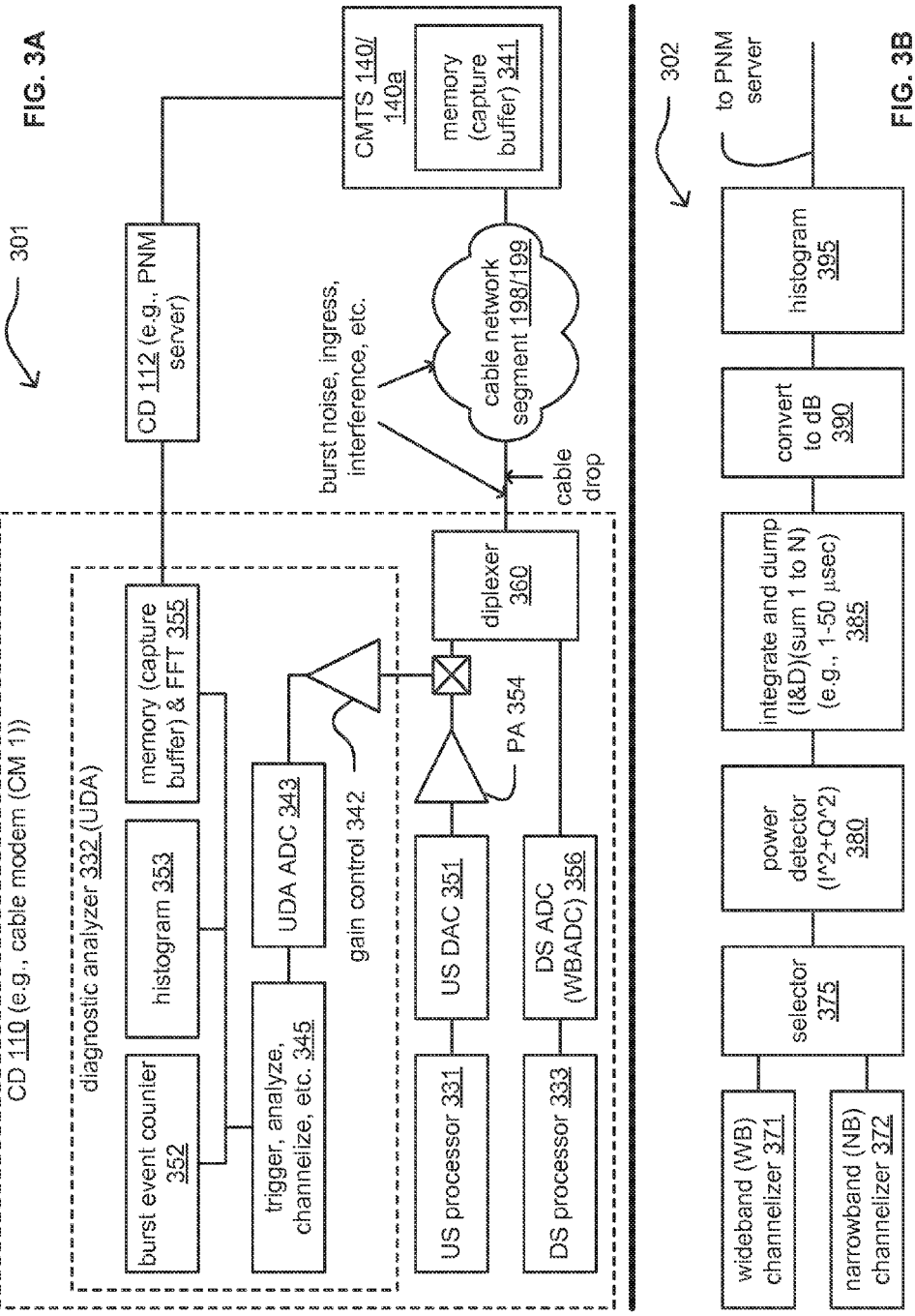

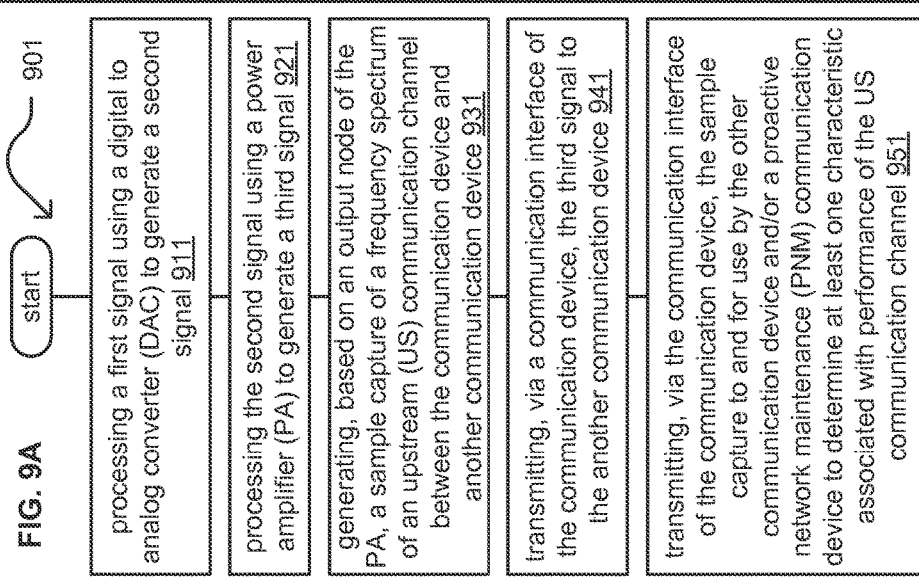

NOISE LOCALIZATION WITHIN CABLE BASED COMMUNICATION SYSTEMS

CROSS REFERENCE TO RELATED PATENTS/PATENT APPLICATIONS

Provisional Priority Claims

The present U.S. Utility patent application claims priority pursuant to 35 U.S.C. §119(e) to U.S. Provisional Application No. 62/030,041, entitled "Noise localization within cable based communication systems," filed Jul. 28, 2014; U.S. Provisional Application No. 62/112,093, entitled "Noise localization within cable based communication systems," filed Feb. 4, 2015; and U.S. Provisional Application No. 62/157,770, entitled "Noise localization within cable based communication systems," filed May 6, 2015, all of which are hereby incorporated herein by reference in their entirety and made part of the present U.S. Utility patent application for all purposes.

BACKGROUND

Technical Field

The present disclosure relates generally to communication systems; and, more particularly, to identifying and characterizing operation of various components within such communication systems including sources of problems arising within such communication systems.

Description of Related Art

Data communication systems have been under continual development for many years. The primary goal within such communication systems is to transmit information successfully between devices. Unfortunately, many things can deleteriously affect signals transmitted within such systems resulting in degradation of or even complete failure of communication. Examples of adverse effects include interference and noise that may be caused by various sources including other communications, natural and man-made noise, low-quality links, degraded or corrupted interfaces and connectors, etc.

Some communication systems use forward error correction (FEC) coding and/or error checking and correction (ECC) coding to increase the reliability and the amount of information that may be transmitted between devices. When a signal incurs one or more errors during transmission, a receiver device can employ the FEC or ECC coding to try to detect and/or correct those one or more errors.

A continual and primary directive in this area of development has been to try continually to lower the signal to noise ratio (SNR) required to achieve a given bit error ratio (BER) or symbol error ratio (SER) within a communication system. The Shannon limit is the theoretical bound for channel capacity for a given modulation and code rate. The ideal goal has been to try to reach Shannon's channel capacity limit in a communication channel. Shannon's limit may be viewed as being the data rate per unit of bandwidth (i.e., spectral efficiency) to be used in a communication channel, having a particular SNR, where transmission through the communication channel with arbitrarily low BER or SER is achievable.

Data communication systems have been under continual development for many years. Sometimes, problems may occur that affect one or more of the various components within such communication systems so that the overall performance is less than optimal. Various problems such as equipment failure, degrading interfaces or connectors, etc. may themselves cause problems and/or allow external noise to enter the link and reduce the overall effectiveness of communications within such communication systems.

Diagnosis of such problems is typically performed by service personnel who conduct a service call to one or more locations where customers complain of poor service. Also, such service personnel can only analyze one given location at a time. A great deal of time is required to perform analysis of multiple locations within a multi-user communication system, and this procedure may be very labor and cost intensive.

BRIEF DESCRIPTION OF THE SEVERAL VIEWS OF THE DRAWINGS

FIG. 3A is a diagram illustrating an example of communications between CDs within one or more communication systems.

FIG. 3B is a diagram illustrating an example of integrated-power histogram generation functionality.

FIG. 9A is a diagram illustrating another embodiment of a method for execution by one or more communication devices.

FIG. 9B is a diagram illustrating another embodiment of a method for execution by one or more communication devices.

DETAILED DESCRIPTION

Figure 1A:
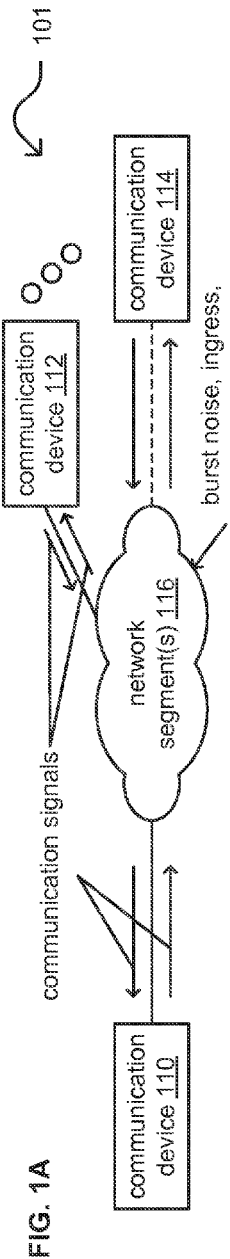
FIG. 1A is a diagram illustrating an embodiment of one or more communication systems.

FIG. 1A is a diagram illustrating an embodiment 101 of one or more communication systems. One or more network segments 116 provide communication inter-connectivity for at least two communication devices 110 and 112 (also referred to as CDs in certain locations in the diagrams). Note that general reference to a communication device may be made generally herein using the term 'device' (e.g., device 110 or CD 110 when referring to communication device 110, or devices 110 and 112, or CDs 110 and 112, when referring to communication devices 110 and 112). Generally speaking, any desired number of communication devices are included within one or more communication systems (e.g., as shown by communication device 114).

The various communication links within the one or more network segments 116 may be implemented using any of a variety of communication media including communication links implemented as wireless, wired, optical, satellite, microwave, and/or any combination thereof, etc. communication links. Also, in some instances, communication links of different types may cooperatively form a connection pathway between any two communication devices. Considering one possible example, a communication pathway between devices 110 and 112 may include some segments of wired communication links and other segments of optical communication links. Note also that the devices 110-114 may be of a variety of types of devices including stationary devices, mobile devices, portable devices, etc. and may support communications for any of a number of services or service flows including data, telephony, television, Internet, media, synchronization, etc.

In an example of operation, device 110 includes a communication interface to support communications with one or more of the other devices 112-114. This communication may be bidirectional/to and from the one or more of the other devices 112-114 or unidirectional (or primarily unidirectional) from the one or more of the other devices 112-114.

In another example of operation, device 110 includes a communication interface and a processor that are implemented to support communications within such communication systems and with other communication devices. For example, one of the devices, such as device 110, includes a communication interface and a processor that cooperatively operate to support communications with another device, such as device 112, among others within the system. The processor is operative to generate and interpret different signals, frames, packets, symbols, etc. for transmission to other devices and that have been received from other devices (e.g., via the communication interface).

In another example of operation, device 110 includes a diagnostic analyzer configured to generate a sample capture of an upstream (US) communication channel between the device 110 and another communication device (e.g., device 112 or 114). The diagnostic analyzer is also configured to process the sample capture of the US communication channel to generate a sample of a frequency spectrum of the US communication channel and/or an integrated power per symbol histogram of the US communication channel. The device 110 also includes a communication interface configured to transmit the sample capture of the US communication channel, the sample of the frequency spectrum of the US communication channel, and/or the integrated power per symbol histogram of the US communication channel to and for use by the other communication device (e.g., device 112 or 114) and/or a proactive network maintenance (PNM) communication device (e.g., which may be device 112 or 114) to determine at least one characteristic associated with performance of the US communication channel. In some examples, note that the device 110 is configured to perform some or all of analysis, processing, etc. of such sample capture, etc. to determine channel performance corresponding to the US communication channel. Some examples of analysis that may be performed by the device 110 may include checking for any spectrum ripple out of bounds of a particular frequency range, channel, band, etc., checking for burst noise above one or more thresholds, etc.

In other examples, note that the device 110 is configured to perform a some or a portion of the analysis, processing, etc. of channel performance corresponding to the US communication channel to generate partially processed information and to transmit the partially processed information to and for use by the other communication device (e.g., device 112 or 114) and/or the PNM communication device (e.g., which may be device 112 or 114) to complete processing of the partially processed information to determine the at least one characteristic associated with performance of the US communication channel.

In another example of operation, device 110 includes a processor configured to generate a first signal. The device 110 also includes a digital to analog converter (DAC) configured to process the first signal to generate a second signal and a power amplifier (PA), which is coupled or connected to the DAC, configured to process the second signal to generate a third signal. In some systems, the DAC has sufficient power (e.g., a high power DAC) that a separate PA in not necessary. In some examples, the PA is a separate physical component, circuitry, component, etc. In other examples, the PA is integrated into the same device (e.g., an integrated circuit or system on a chip (SOC)) as one or more main processing circuitries. In such an example that includes a DAC and PA, the device 110 also includes a diagnostic analyzer configured to generate, based on an output node of the PA, a sample capture of a frequency spectrum of an upstream (US) communication channel between the communication device and another communication device. In some examples, the diagnostic analyzer is configured to generate a sample or a frequency spectrum of the US communication channel and/or an integrated power per symbol histogram of the US communication channel for comparison between the device 110 and another communication device (e.g., device 112 or 114).

The device 110 also includes a communication interface configured to transmit the third signal to the other communication device. The communication interface is also configured to transmit the sample capture to and for use by the other communication device and/or a PNM communication device to determine at least one characteristic associated with performance of the US communication channel.

In an example of implementation, the device 110 includes a digital to analog converter (DAC) configured to process a first signal generated by a processor to generate a second signal (e.g., such that the second signal is an analog version of the first signal, wherein the first signal has undergone digital to analog conversion to generate the second signal). The device 110 can also include a power amplifier (PA) configured to process the second signal to generate third signal (e.g., such that the third signal is an amplified version of the second signal).

The device 110 includes a diagnostic analyzer that is selectively configured to operate based on a control signal, generated by the processor, that directs and/or instructs the diagnostic analyzer to perform a particular type of sample capture based on at least one operational parameter and based on one or more trigger conditions. The selection of trigger mechanisms can be one parameter that governs the effectiveness of the diagnostic analyzer. The control signal may be implemented in any of a number of ways to indicate different directions and/or instructions (e.g., including a first value to direct the diagnostic analyzer to perform a first operation, and a second value to direct the diagnostic analyzer to perform a second operation).

In another example of implementation that includes a diagnostic analyzer, the device 110 includes an analog to digital converter (ADC) is configured to sample the signal of interest present on the cable. The signal of interest may include the noise present on the cable as well as the upstream signal transmitted by the device 110 (e.g., a cable modem). The diagnostic analyzer of the device 110 is configured to detect, sample, process, etc. the signal present on the drop cable connecting the subscriber to the cable system. Noise originating in the drop cable, ground block, and/or tap plate may propagate in both directions, toward the head end and back into the device 110. If the diagnostic analyzer is located in the device 110, it will be positioned effectively to sample this noise. Noise coming from within the subscriber premises is also of interest. Such noise may reach the diagnostic analyzer directly through a signal distribution splitter from a bonded connection to a premises electrical system ground or via "jumping" across two ports of a splitter that may connect the device 110 to the drop cable and to the rest of the subscriber premise. The diagnostic analyzer may be connected to any of the ports of this splitter (e.g., such as described with reference to FIGS. 7B and 7C). The diagnostic analyzer is configured to be connected at any point where it will have maximum access to sample the noise signals, providing the most information about the noise.

In addition, sampling of the upstream signal transmitted by the device 110 (e.g., called the device 110 Tx signal) is of interest. The device 110 Tx signal provides loop-back information about the operation of the device 110, and also provides a reference to which upstream noise can be compared. Some modes operate to capture the device 110 Tx signal for its usefulness as mentioned above. Other modes operate to suppress the device 110 Tx signal so as to mask the noise that is to be analyzed or to stress the dynamic range of the diagnostic analyzer. This suppression may be done by canceling the device 110 Tx signal using analog or digital techniques, by attenuating the device 110 Tx signal using directional couplers, subtracting the device 110 Tx signal, and/or by avoiding the device 110 Tx signal by sampling during periods of time when the device 110 is not transmitting. Since the Tx signal is known to the device (i.e., device 110) that transmits device 110 Tx signal, subtraction of the device 110 Tx signal may be accomplished by generating an analog copy of the known Tx signal using a DAC and subtracting this Tx copy signal from the signal at the input of the UDA ADC to generate a residual Tx signal. Also, adaptive filtering may be used to generate the Tx copy signal in order to minimize the residual Tx signal remaining after the subtraction. In even other examples, one or more directional couplers may be included to ensure effective isolation of any signal(s). For example, the CD 110 can operate by attenuating the device 110 Tx signal by canceling it as described above (e.g., using digital and/or analog means), and/or using a directional coupler and/or splitter that gives advantage to the burst noise coming into the CD 110.

In some examples, the control signal instructs the diagnostic analyzer to sample the third signal based on a sample capture corresponding to a broad bandwidth of a usable frequency spectrum of an upstream (US) communication channel between the device 110 and another communication device (e.g., device 112) to generate a full bandwidth (e.g., "fullband") signal capture. In other examples, the control signal instructs the diagnostic analyzer to sample the third signal based on a fullband sample capture corresponding to a broad bandwidth of an entirety of a usable frequency spectrum of the US communication channel between the device 110 and another communication device (e.g., device 112) to generate a fullband signal capture. In other examples, the control signal instructs the diagnostic analyzer to sample the third signal based on a narrow bandwidth (e.g., "narrowband") subset sample capture corresponding to a subset of the usable frequency spectrum of the US communication channel between the device 110 and another communication device (e.g., device 112) to generate a subset signal capture. Examples of such a subset sample capture can include a narrowband sample capture corresponding to a subset bandwidth (e.g., a specified one or more narrowband bandwidths) of the usable frequency spectrum of the US communication channel between the device 110 and another communication device (e.g., device 112) to generate a narrowband signal capture. In general, with respect to each of a number of different modes of operation, the diagnostic analyzer performs a sample capture of whatever signal is present at the input to the analog to digital converter (ADC) thereof including noise, interference, ingress, etc. and/or the device 110 Tx signal (e.g., when the device 110 is transmitting during the sample capture).

In alternative implementations, the control signal as generated by the processor alternatively directs and/or instructs the diagnostic analyzer to perform even other types of sample captures. In yet another possible implementation, when the control signal directs and/or instructs the diagnostic analyzer to sample the third signal based on a trigger that is comprised of at least one condition (e.g., a combination of one or more conditions).

In some examples, the sampling of the third signal (e.g., whether a fullband sample capture, a narrowband sample capture, or other sample capture) is made of the third signal that is output from the power amplifier (PA). The signal output from the PA is tapped and sampled by the diagnostic analyzer based on one or more parameters and based on the control signal provided by the processor.

The communication interface of the device 110 is configured to transmit the third signal to the other communication device (e.g., device 112) and also to transmit the fullband signal capture and/or the narrowband signal capture to and for use by the other communication device (e.g., device 112) and/or a PNM communication device (e.g., another device such as device 114 or even device 112 if implemented to include PNM functionality and capability) to determine at least one characteristic associated with performance of the US communication channel. The device 110 may itself perform functions of the PNM server. For example, the device 110 may perform all of a portion of channel performance analysis and may send any of the results of the signal capture, partial analysis, or full analysis to the other communication device (e.g., device 112).

In another example, the communication interface is also configured to receive another control signal from such a PNM communication device (e.g., device 114 or 112). This another control signal specifies at least one parameter for use by the diagnostic analyzer within the device 110 to sample the third signal to generate the fullband signal capture and/or the narrowband signal capture. The processor of the device 110 is configured to generate the control signal based on this another control signal received from the PNM communication device (e.g., device 114 or 112).

In another example, the PNM communication device (e.g., device 114) is further configured to receive the fullband signal capture and/or the narrowband signal capture from the device 110. The PNM communication device (e.g., device 114) is also configured to receive at least one other signal capture from the device 112 such that this at least one other signal capture is based on the third signal received at the device 112 after transmission via the US communication channel between the device 110 and the device 112. The PNM communication device (e.g., device 114) is further configured to process this at least one other signal capture and the fullband signal capture and/or the narrowband signal capture to determine the at least one characteristic associated with performance of the US communication channel between the device 110 and the device 112.

Figure 1B:
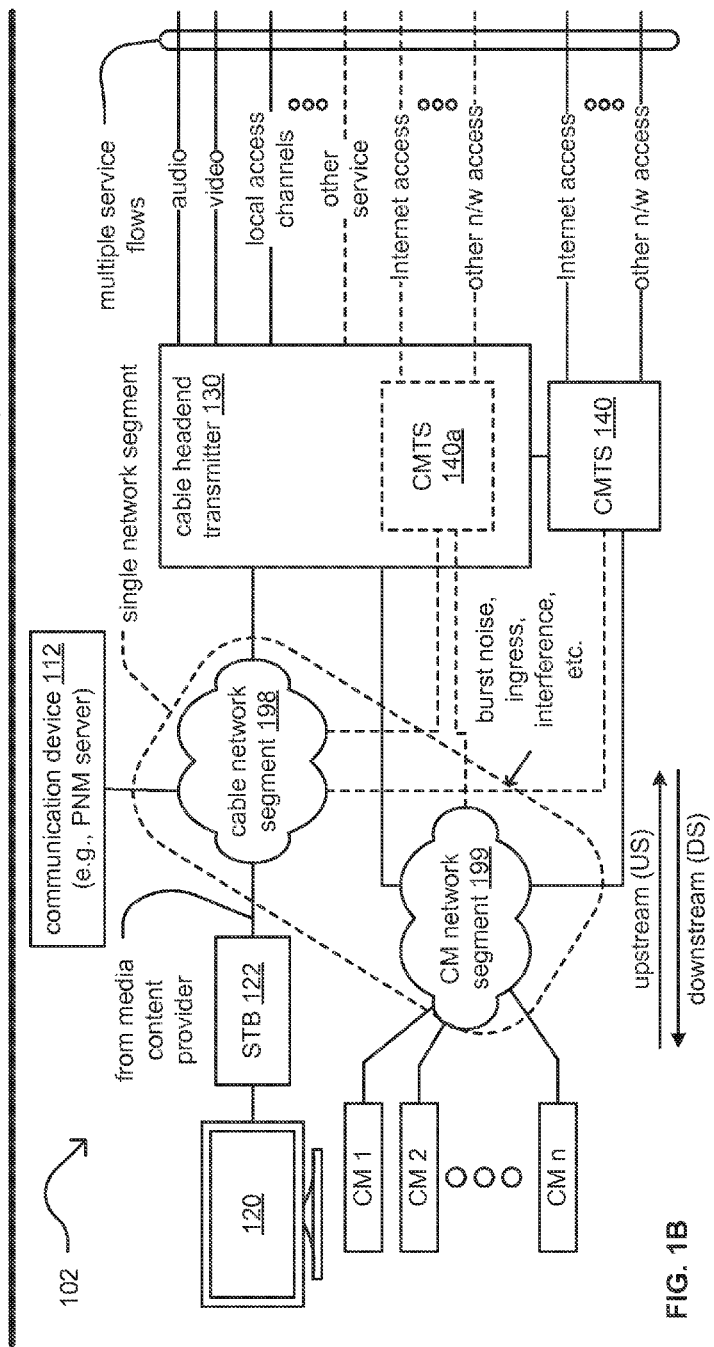
FIG. 1B is a diagram illustrating another embodiment of one or more communication systems.

FIG. 1B is a diagram illustrating another embodiment 102 of one or more communication systems. A cable headend transmitter 130 provides service to a set-top box (STB) 122 via cable network segment 198. The STB 122 provides output to a display capable device 120. The cable headend transmitter 130 can support any of a number of service flows such as audio, video, local access channels, as well as any other service of cable systems. For example, the cable headend transmitter 130 can provide media (e.g., video and/or audio) to the display capable device.

The cable headend transmitter 130 may provide operation of a cable modem termination system (CMTS) 140a. For example, the cable headend transmitter 130 may perform such CMTS functionality, or a CMTS may be implemented separately from the cable headend transmitter 130 (e.g., as shown by reference numeral 140) or may be implemented in a remotely distributed architecture between the headend and other cable network segments (198, 199). The CMTS 140 can provide network service (e.g., Internet, other network access, etc.) to any number of cable modems (shown as CM 1, CM 2, and up to CM n) via a cable modem (CM) network segment 199. The cable network segment 198 and the CM network segment 199 may be part of a common network or common networks. The cable modem network segment 199 couples the cable modems 1 through n to the CMTS (shown as 140 or 140a). Such a cable system (e.g., cable network segment 198 and/or CM network segment 199) may generally be referred to as a cable plant and may be implemented, at least in part, as a hybrid fiber-coaxial (HFC) network (e.g., including various wired and/or optical fiber communication segments, light sources, light or photo detection components, etc.). Any of a number of various portions of the cable system may be deleteriously affected by burst noise, ingress, interference, etc. and/or other deleterious effects.

A CMTS 140 (or 140a) is a component that exchanges digital signals with cable modems 1 through n on the cable modem network segment 199. Each of the cable modems is coupled to the cable modem network segment 199, and a number of elements may be included within the cable modem network segment 199. For example, routers, splitters, couplers, relays, and amplifiers may be contained within the cable modem network segment 199. Generally speaking, downstream information may be viewed as that which flows from the CMTS 140 to the connected cable modems (e.g., CM 1, CM2, etc.), and upstream information as that which flows from the cable modems to the CMTS 140. Note that many CMTSs may be located remotely or even distributed relative to a more central CMTS (e.g., CMTS 140 (or 140a)).

Another communication device 112, such as a proactive network maintenance (PNM) communication device (e.g., a PNM server), is also implemented within the communication system(s) and is configured to support communications with any of the various other communication devices therein. The PNM server sends commands to the diagnostic analyzers, which are located at various places in the cable plant, usually associated with CMs, and the PNM server obtains and analyzes the data captured from the diagnostic analyzers.

The PNM server functionality may reside in a separate physical location, or it may be partitioned among many locations. For example, the CM or CMTS may do some or all of the PNM analysis for certain measurements. In a further example, the CM may use a threshold or other criteria to determine when to capture or process data. This threshold or criteria may be adaptable or adjusted by the CM, CMTS or PNM server. In another example, the CM may average or otherwise process temporal or spectral captures (e.g., or generate temporal or spectral samples based on a sample capture of a sample of a communication channel). For an example of operation, the CM generates a sample capture of a communication channel between the CM and the CMTS or PNM server. The CM then processes the sample capture of the communication channel to generate a sample of a frequency spectrum of the communication channel and/or an integrated power per symbol histogram of the communication channel.

In an example of operation, the device 112 (e.g., PNM server) transmits at least one control signal to the CM 1 and the CMTS 140 (or 140a). This at least one control signal specifies at least one parameter for use by the CM 1 and the CMTS 140 (or 140a) to sample a signal to be transmitted by the CM 1 to the CMTS 140 (or 140a) via a communication channel between the CM 1 and the CMTS 140 (or 140a). The device 112 (e.g., PNM server) receives a first signal capture from the CM 1 such that the CM 1 generates the first signal capture by sampling the signal based on the at least one parameter before transmission to the CMTS 140 (or 140a) via the communication channel between the CM 1 and the CMTS 140 (or 140a). The device 112 (e.g., PNM server) also receives a second signal capture from the CMTS 140 (or 140a) such that the CMTS 140 (or 140a) generates the second signal capture by sampling the signal based on the at least one parameter after receipt of the signal by the CMTS 140 (or 140a). The device 112 (e.g., PNM server) then determines at least one characteristic associated with performance of the communication channel between the CM 1 and the CMTS 140 (or 140a).

In another example, the CM 1 includes a digital to analog converter (DAC) configured to generate an analog or continuous-time signal based on a digital signal and may also include a power amplifier (PA) configured to process the analog or continuous-time signal to generate an amplified analog or continuous-time signal. The CM 1 also includes a diagnostic analyzer configured to sample the amplified analog or continuous-time signal output from the PA, along with any noise signals present, based on a fullband sample capture corresponding to a full bandwidth of a usable frequency spectrum of an upstream (US) communication channel between the CM 1 and the CMTS 140 (or 140a) to generate a fullband signal capture. The diagnostic analyzer of the CM 1 may also be configured to sample the amplified analog or continuous-time signal output from the PA, along with any noise signals present, based on a narrowband sample capture corresponding to a subset bandwidth of the usable frequency spectrum of the US communication channel between the CM 1 and the CMTS 140 (or 140a) to generate a narrowband signal capture. The CM 1 also includes a communication interface configured to transmit the amplified analog or continuous-time signal to the CMTS 140 (or 140a) and also to transmit such a fullband signal capture and/or the narrowband signal capture to and for use by the CMTS 140 (or 140a) or the device 112 (e.g., PNM server) to determine at least one characteristic associated with performance of the US communication channel between the CM 1 and the CMTS 140 (or 140a). Similarly, several CMs and/or the CMTS 140 (or 140a) may simultaneously capture a waveform (e.g., multiple CMs and/or the CMTS 140 (or 140a) may simultaneously perform a sample capture). The PNM server may compare the captures using techniques such as cross-correlation. The PNM server may compare the spectra, amplitudes, times of arrival, and all other parameters associated with the captures from the CMs and CMTS, and may apply various algorithms to analyze these measurements. The PNM server may utilize the results of this analysis to locate the source of the noise present on the cable plant, or to identify CMs or other components that are not performing properly.

Figure 2A:
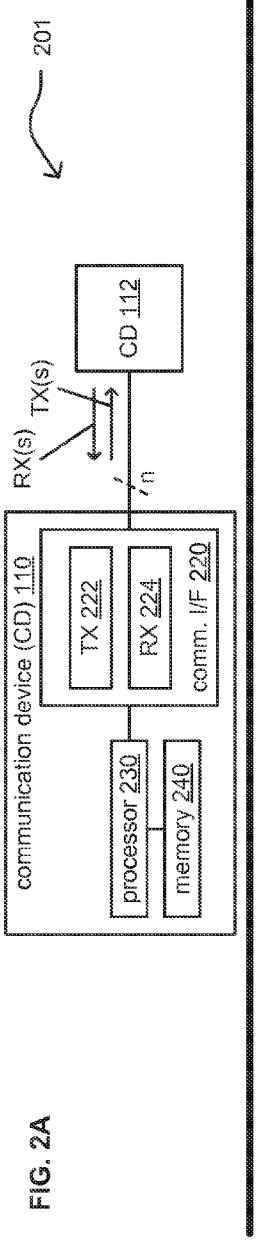
FIG. 2A is a diagram illustrating an example of a communication device (CD) operative within one or more communication systems.

FIG. 2A is a diagram illustrating an example 201 of a communication device (CD) 110 operative within one or more communication systems. The device 110 includes a communication interface 220 and a processor 230. The communication interface 220 includes functionality of a transmitter 222 and a receiver 224 to support communications with one or more other devices within a communication system. The device 110 may also include memory 240 to store information including one or more signals generated by the device 110 or such information received from other devices (e.g., device 112) via one or more communication channels. Memory 240 may also include and store various operational instructions for use by the processor 230 in regards to the processing of messages and/or other received signals and generation of other messages and/or other signals including those described herein. Memory 240 may also store information including one or more types of encoding, one or more types of symbol mapping, concatenation of various modulation coding schemes, etc. as may be generated by the device 110 or such information received from other devices via one or more communication channels. The communication interface 220 supports communications to and from one or more other devices (e.g., CD 112 and/or other communication devices). Operation of the communication interface 220 may be directed by the processor 230 such that processor 230 transmits and receives signals (TX(s) and RX(s)) via the communication interface 220.

Generally speaking, the communication interface 220 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and or frequency downscaling, such as to a baseband frequency at which one or more of the components of the device 110 operates), equalization, pre-equalization, metric generation, symbol mapping and/or de-mapping, automatic gain control (AGC) operations, and/or any other operations that may be performed by an AFE and/or PHY component within a communication device.

In an example of operation, the processor 230 and the communication interface 220 of the CD 110 generate and transmit signals to CD 112 and also receive and process signals received from CD 112.

In an example of operation, the CD 110 is configured to generate a signal capture by sampling a signal based on the at least one parameter before transmission to the CD 112 via the communication channel between the CD 110 and the CD 112. In some instances, this at least one parameter is provided from the CD 112 or another communication device such as a proactive network maintenance (PNM) device. The signal capture is processed by the CD 112 and/or the PNM device to determine the at least one characteristic associated with performance of the US communication channel between the CD 110 and the CD 112.

In an example of operation, the CD 110 is configured to support communication with CD 112. The CD 110 is configured to receive a sample capture from CD 112. The CD 112 includes a diagnostic analyzer configured to generate the sample capture based on an output node of a power amplifier (PA) of the CD 112, the sample capture is based on a frequency spectrum of an upstream (US) communication channel between the CD 112 and the communication device. The CD 112 is configured to process the sample capture to determine at least one characteristic associated with performance of the US communication channel between the CD 110 and the CD 112.

In another example of operation, the CD 110 is configured to receive a signal from CD 112 and to generate another signal capture based on the signal that is received from CD 112. The CD is also configured to receive the sample capture from the CD 112. The CD 112 includes the diagnostic analyzer configured to generate the sample capture when the CD 112 is transmitting the signal to the CD 110, and the CD 110 is configured to process the sample capture and the another signal capture to determine at least one characteristic associated with performance of the US communication channel between the CD 110 and the CD 112.

In another example of operation, the CD 110 is configured to receive a signal from CD 112 and to generate, based on the signal that is received from CD 112, a first sample capture of a fullband frequency spectrum of the US communication channel between the CD 110 and the CD 112. The CD 110 is configured to generate, based on the signal that is received from CD 112, a second sample capture of a subset of the fullband frequency spectrum of the US communication channel between the CD 110 and the CD 112. The CD 110 is also configured to process the sample capture and the first sample capture and/or the second sample capture to determine another at least one characteristic associated with performance of the US communication channel between the CD 110 and the CD 112. In some example, the CD 110 is also configured to determine characteristics of burst/impulse noise and/or narrowband ingress based on processing of such signals.

In another example of operation, the CD 110 is configured to support communication with another communication device (e.g., CD 112). The CD 110 is configured to receive a sample capture of an upstream (US) communication channel between the CD 112 and the CD 112, a sample of a frequency spectrum of the US communication channel that is based on the sample capture of the US communication channel, and/or an integrated power per symbol histogram of the US communication channel. The CD 112 includes a diagnostic analyzer configured to generate the sample capture of the US communication channel, the sample of the frequency spectrum of the US communication channel, and/or the integrated power per symbol histogram of the US communication channel. The CD 110 is configured to process the sample capture of the US communication channel, the sample of the frequency spectrum of the US communication channel that is based on the sample capture of the US communication channel, and/or the integrated power per symbol histogram of the US communication channel to determine at least one characteristic associated with performance of the US communication channel between the CD 110 and the CD 112.

Note that device 110 may be implemented to operate as any one or more of a satellite communication device, a wireless communication device, a wired communication device, a fiber-optic communication device, or a mobile communication device and implemented and/or operative within any one or more communication systems including a satellite communication system, a wireless communication system, a wired communication system, a fiber-optic communication system, or a mobile communication system.

Figure 2B:
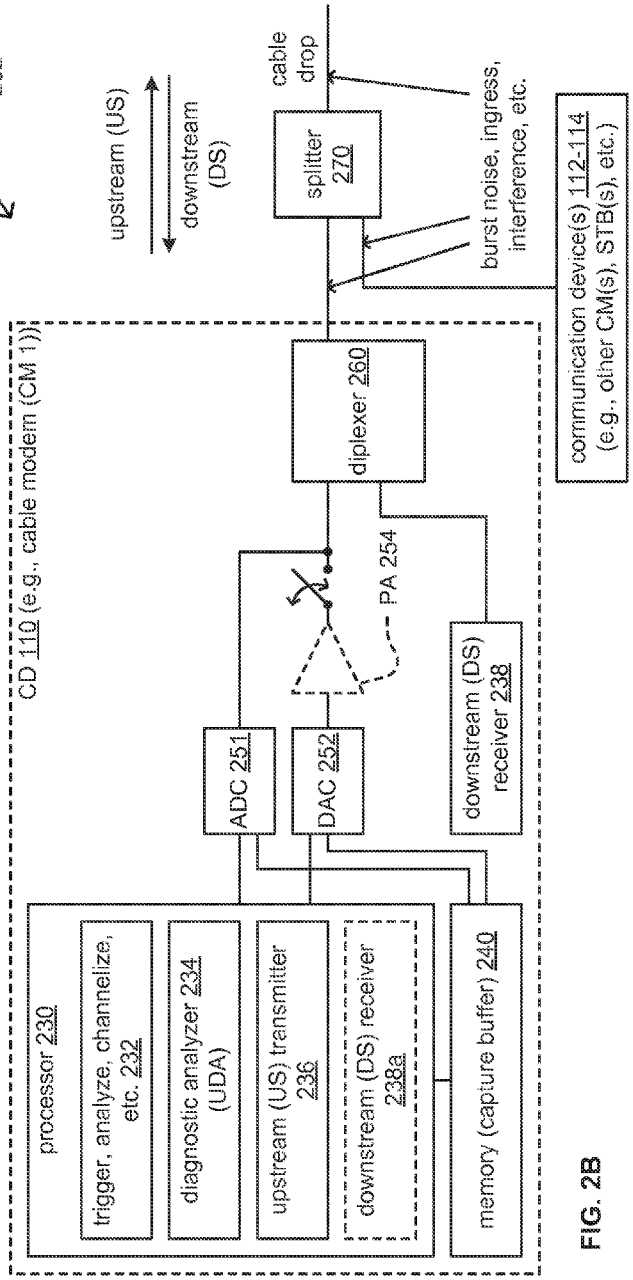
FIG. 2B is a diagram illustrating another example of a CD operative within one or more communication systems.

FIG. 2B is a diagram illustrating another example 202 of a CD 110 operative within one or more communication systems. The CD 110 (e.g., a cable modem (CM 1), such as shown with reference to FIG. 1B). The CD 110 is connected or coupled to a splitter 270 that receives a signal from the cable drop at the premises at which the CD 110 is situated; note that the cable drop may be viewed as that segment of a cable based communication system that is provided by a multiple system operator (MSO), a cable service provider, etc. In some examples, the splitter 270 splits off signals to one or more other communication devices 112-114 (e.g., CM(s), STB(s), etc.). Note that any of the various input(s), output(s), etc. may be deleteriously affected by burst noise, ingress, interference, etc. and/or other deleterious effects.

Any of a number of various portions of the cable system may be deleteriously affected by burst noise, ingress, interference, etc. and/or other deleterious effects.

The CD 110 includes a diplexer 260 (or alternatively, another filtering device, such as a triplexer, or other device) that services both upstream (US) and downstream (DS) communications to and from the CD 110, a DS receiver 238 that processes, demodulates, decodes, and/or interprets signals received via the cable drop and the diplexer 260. A processor 230 includes functionality and capability to perform various operations including trigger, analyze, channelize, etc. 232, diagnostic analyzer (e.g., upstream diagnostic analyzer (UDA)) 234, an upstream (US) transmitter 236, etc. and in some examples, include a DS receiver 238a that performs part or all of the DS receiver functionality. For example, the DS receiver 238a can augment operations of the DS receiver 238 or be implemented instead of the DS receiver 238. Memory 240 serves to store signal captures made based on any number of parameters. A digital to analog converter (DAC) 252 converts digital signals to analog or continuous-time signals, and a power amplifier (PA) 254 can be implemented if desired or necessary to amplify the analog or continuous-time signals. A switch or tap feeds the amplified analog or continuous-time signal to an analog to digital converter (ADC) 251 that generates digital samples there from and provides such digital samples to the memory 240 and/or the processor 230.

The processor 230, when performing upstream diagnostic analyzer (UDA) related operations, is configured selectively to sample the analog or continuous-time signal from the DAC 252 (or the amplified analog or continuous-time signal from the PA 254 when implemented) based on a fullband sample capture corresponding to a full bandwidth of a usable frequency spectrum of an upstream (US) communication channel between the CD 110 and at least one other communication device to generate a fullband signal capture and/or based on a narrowband sample capture corresponding to a subset bandwidth of the usable frequency spectrum of the US communication channel between the CD 110 and the at least one other communication device to generate a narrowband signal capture. In some examples, the CD 110 is configured to perform such signal capture of the analog or continuous-time signal from the DAC 252 (or the amplified analog or continuous-time signal from the PA 254 when implemented) based on other parameter(s). The CD 110 can be instructed as to how to perform such signal capture based on signals received from other communication devices in the system, including the arrival of a specified timestamp. The CD 110 then transmits the signal capture (e.g., possibly after performing partial or full analysis of the captured signal) to another communication device (e.g., a CMTS, a PNM, etc.) for use by that another communication device to determine at least one characteristic associated with performance of the US communication channel extending from the CD 110 via the cable drop. In some examples, it is also possible to use other channels to communicate the captured signal and analysis results (e.g., such as a separate Internet connection over a wired, wireless, and/or other type of network).

In another example of operation, device 110 includes processor 230 that is configured to generate a first signal. The DAC 252 of device 110 is configured to process the first signal to generate a second signal. PA 254, which is coupled or connected to the DAC 252, is configured to process the second signal to generate a third signal. The diagnostic analyzer (e.g., upstream diagnostic analyzer (UDA)) 234 is configured to generate, based on an output node of the PA 254, a sample capture of a frequency spectrum of an upstream (US) communication channel between the communication device and another communication device. The device 110 also includes a communication interface configured to transmit the third signal to the other communication device. The communication interface is also configured to transmit the sample capture to and for use by the other communication device and/or a proactive network maintenance (PNM) communication device to determine at least one characteristic associated with performance of the US communication channel.

In another example of operation, the diagnostic analyzer (e.g., upstream diagnostic analyzer (UDA)) 234 is configured to generate, based on the output node of the PA 254, the sample capture of the frequency spectrum of the US communication channel between the communication device and the other communication device when the communication interface is transmitting the third signal to the other communication device. The diagnostic analyzer (e.g., upstream diagnostic analyzer (UDA)) 234 is configured to generate, based on the output node of the PA 254, another sample capture of the frequency spectrum of the US communication channel between the communication device and the other communication device when the communication interface is not transmitting any signal to the other communication device.

In another example of operation, the diagnostic analyzer (e.g., upstream diagnostic analyzer (UDA)) 234 is configured to process a fourth signal received via the output node of the PA when the communication interface is transmitting the third signal to the other communication device including performing attenuating the fourth signal and/or canceling at least a portion of the third signal from the fourth signal to generate the sample capture of the frequency spectrum of the US communication channel between the communication device and the other communication device.

In another example of operation, the diagnostic analyzer (e.g., upstream diagnostic analyzer (UDA)) 234 is configured to process the sample capture to generate partially processed information that corresponds to the sample capture. The device 110 is also configured to transmit (e.g., via a communication interface of the device 110) the partially processed information that corresponds to the sample capture to and for use by the other communication device and/or the PNM communication device to complete processing of the partially processed information to generate fully processed information that corresponds to the sample capture and to determine another at least one characteristic associated with performance of the US communication channel based on the fully processed information that corresponds to the sample capture. When the diagnostic analyzer (e.g., upstream diagnostic analyzer (UDA)) 234 is configured to generate the partially processed information, a reduction in the amount of information that gets transmitted to and for use by the other communication device and/or the PNM communication device for use, at least in part, to determine another at least one characteristic associated with performance of the US communication channel based on the fully processed information that corresponds to the sample capture.

In another example of operation, the diagnostic analyzer (e.g., upstream diagnostic analyzer (UDA)) 234 is configured to generate, based on the output node of the PA 254, a first sample capture of a fullband frequency spectrum of the US communication channel between the communication device and the other communication device. The diagnostic analyzer (e.g., upstream diagnostic analyzer (UDA)) 234 is also configured to generate, based on the output node of the PA 254, a second sample capture of a subset of the fullband frequency spectrum of the US communication channel between the communication device and the other communication device. The device 110 is also configured to transmit (e.g., via a communication interface of the device 110) the first sample capture and/or the second sample capture to and for use by the other communication device and/or the PNM communication device to determine another at least one characteristic associated with performance of the US communication channel.

In another example of operation, the diagnostic analyzer (e.g., upstream diagnostic analyzer (UDA)) 234 is configured to generate, based on the output node of the PA 254, the sample capture of the frequency spectrum of the US communication channel between the communication device and the other communication device based on at least one trigger condition that includes a first timestamp received from the other communication device, a second timestamp received from the PNM communication device, an energy threshold, a power threshold, a first control signal received from the other communication device, a second control signal received from the PNM communication device; a third control signal generated by the processor, and/or a detection of at least one of a burst noise event or a clipping event associated with the US communication channel. The clipping may occur in external equipment such as lasers or amplifiers, or in the diagnostic analyzer itself, as in the case of a sample exceeding the range of the ADC in the diagnostic analyzer or exceeding the range of a digital word in the diagnostic analyzer.

FIG. 3A is a diagram illustrating an example 301 of communications between CDs within one or more communication systems. The CD 110 includes a diagnostic analyzer 332 (e.g., that supports upstream diagnostic analyzer (UDA) functionality).

The CD 110 is connected or coupled to a cable drop at the premises at which the CD 110 is situated. The cable drop is connected or coupled to one or more cable network segments 198/199, and a CMTS 140/140a, which includes a memory (capture buffer) 355, is also connected or coupled to the one or more cable network segments 198/199. Note that any of a number of various portions of the one or more cable network segments 198/199 may be physically damaged and/or its signal deleteriously affected by burst noise, ingress, interference, etc. and/or other deleterious effects. Also, note that the cable drop itself 199 may be physically damaged and/or its signal deleteriously affected by burst noise, ingress, interference, etc. and/or other deleterious effects. Noise may also originate in the home and be coupled into the cable system.

A diplexer 360 services both US and DS communications to and from the CD 110. A DS ADC (e.g., wideband ADC (WBADC) 356, or alternatively a fullband ADC (FBADC)) receives and samples signals from the diplexer and provides them to a DS processor 333. An US processor 331 generates digital signals for transmission US, an US DAC 351, and a PA 354 generates amplified analog or continuous-time signals there from. Note that the diplexer 360 may be used by the diagnostic analyzer for convenience (e.g., a diplexer 360 can be implemented in a CM, or alternatively, a triplexer can be implemented in a CM). However, in general, another filter (e.g., such as a lowpass filter (LPF) passing signals below some upstream (US) frequency limit such as 42 MHz, 65 MHz, or 108 MHz, etc.) may be used instead of the diplexer to separate out the signals of interest to the analyzer, and to reject signals not of interest to the diagnostic analyzer.

A tap feeds back the signals from the PA 354 (or from any other desired sample point within the devices, such as before the PA 354, at an output of a digital to analog converter (DAC), at any of various nodes such as described with reference to FIG. 7B and FIG. 7C) to gain control 342 that provides a scaled/adjusted signal to an upstream diagnostic analyzer (UDA). ADC 343 is implemented to sample signals, after any scaling, from the US port of the CD 110 at the diplex filter/diplexer 360 generates analog or continuous-time signals based on those digital signals, then samples the signals from the gain control 342 and provides them for trigger, and to be analyzed, channelized, etc. 345. In some examples, the power of the gain control 342 is adjusted or tuned upwards (e.g., to maximum value, to a relatively higher value, etc.) when the CD 110 is not transmitting any signal and then adjusted or tuned back down (e.g., to the prior value, to a relatively lower than maximum value, etc.) when the CD 110 is transmitting.

In some examples, the gain control is set to a value determined by the dynamic range of the ADC and the distribution of the input signals, to prevent under-loading or over-loading of the ADC. Once set, the gain will typically not be varied during a sample capture. A burst event counter 352, a histogram 353, and a memory (capture buffer) & fast Fourier transform (FFT) 355 are all connected to the trigger, analyze, channelize, etc. 345. Information within the memory (capture buffer) & FFT 355 can be transmitted from the CD 110 to another CD 112 (e.g., PNM server).

The diagnostic analyzer 332 (UDA) includes circuitry, component(s), element(s), etc. having capability to measure signals present on the drop cable in the US frequency band(s) including impulse/burst noise and narrowband ingress. The diagnostic analyzer 332 (UDA) provides information to the CD 112 (e.g., PNM server) that enables it to find the location of any source of US noise. The diagnostic analyzer 332 (UDA) may be used continually or infrequently (e.g., such as when the CD 112 (e.g., PNM server) is searching for a noise source).

The diagnostic analyzer 332 (UDA) can be implemented to operate in any of a number of modes. Note that some modes may be a combination of two or more elemental modes. Some examples of modes of operation of operating the diagnostic analyzer 332 (UDA) include performing fullband sample capture; subset of fullband sample capture (e.g., based on one or more narrowband sample captures); power based considerations (e.g., integrated-power histogram); particular settings for various components, elements, circuitry, circuitries, etc. such as analog front end (AFE), analog to digital converter (ADC), power amplifier (PA), etc.

Certain examples of certain modes of operations are described below.

1. Wideband sample capture: The CMTS 140/140a and diagnostic analyzer 332 (UDA) of the CD 110 capture samples of burst noise events (e.g., the UDA stores them in memory (capture buffer) 341). Time-domain samples and/or spectra are sent to the CD 112 (e.g., PNM server). Since many noise events, such as man-made noise events, occur at low frequencies (e.g., below 10 MHz) configuring the narrowband detector to a frequency band (e.g., 5-7 MHz) will detect most noise events while not being affected by the CM Tx signal, or transmit signals from STBs or other devices in the home, which may be located at a higher frequency (e.g., such as above 10 MHz). The CD 112 (e.g., PNM server) compares samples and/or spectra of the same event from multiple locations.

2. Narrowband burst detector/sample capture: The diagnostic analyzer 332 (UDA) triggers on narrowband burst noise events and provides measurements of the events. The CD 112 (e.g., PNM server) server compares measurements from the CMTS 140/140a and multiple UDA locations (e.g., within multiple CMs implemented throughout the communication system).

3. Integrated-power histogram: The diagnostic analyzer 332 (UDA) integrates the power of the sampled input signal in one or more configurable periods of time (e.g., 20 µs or 40 µs windows are examples consistent with DOCSIS 3.1 symbol times) and provides a histogram of the integrated power. If desired, the integration period may be synchronized with the upstream timing of the OFDMA symbols.

In some examples, a device or system including such UDA functionality can be designed to meet the following functional requirements for various elements:

Measurement point: include a high-impedance resistive tap after the US PA 354 and at US port of the diplexer 360. Some examples include less than 0.1 dB reduction in transmit (TX) power due to tapping of signal.

Analog front end (AFE): Adjust analog gain to include 10-20 dB above the transmit signal range from the CD 110. This can serve to protect against burst noise which may be much greater than transmit signal.

Analog-to-digital converter (ADC): set to operate using signals based on a certain number of symbols per second (e.g., 540 Msps (sps=symbols per second), 9 enob (enob=effective number of bits)).

Clip detection at multiple locations including: ADC output, wideband (WB) channelizer, and narrowband (NB) channelizer.

Gain control: AFE attenuation proportional to max(TX_power, P0), where P0 a selected power (e.g., approximately 30 dBmV). The CD 110 can include adjustment capability to adjust gain further based on clip detectors.

Decimator: Filter/decimate channelizer chain, which may be implemented using multiple stages each performing divide by powers of 2 starting from some number of symbol per second (e.g., 540 Msps), to cover diplexer splits (e.g., 42, 65, 85, 108, 204 MHz).

Figure 4:
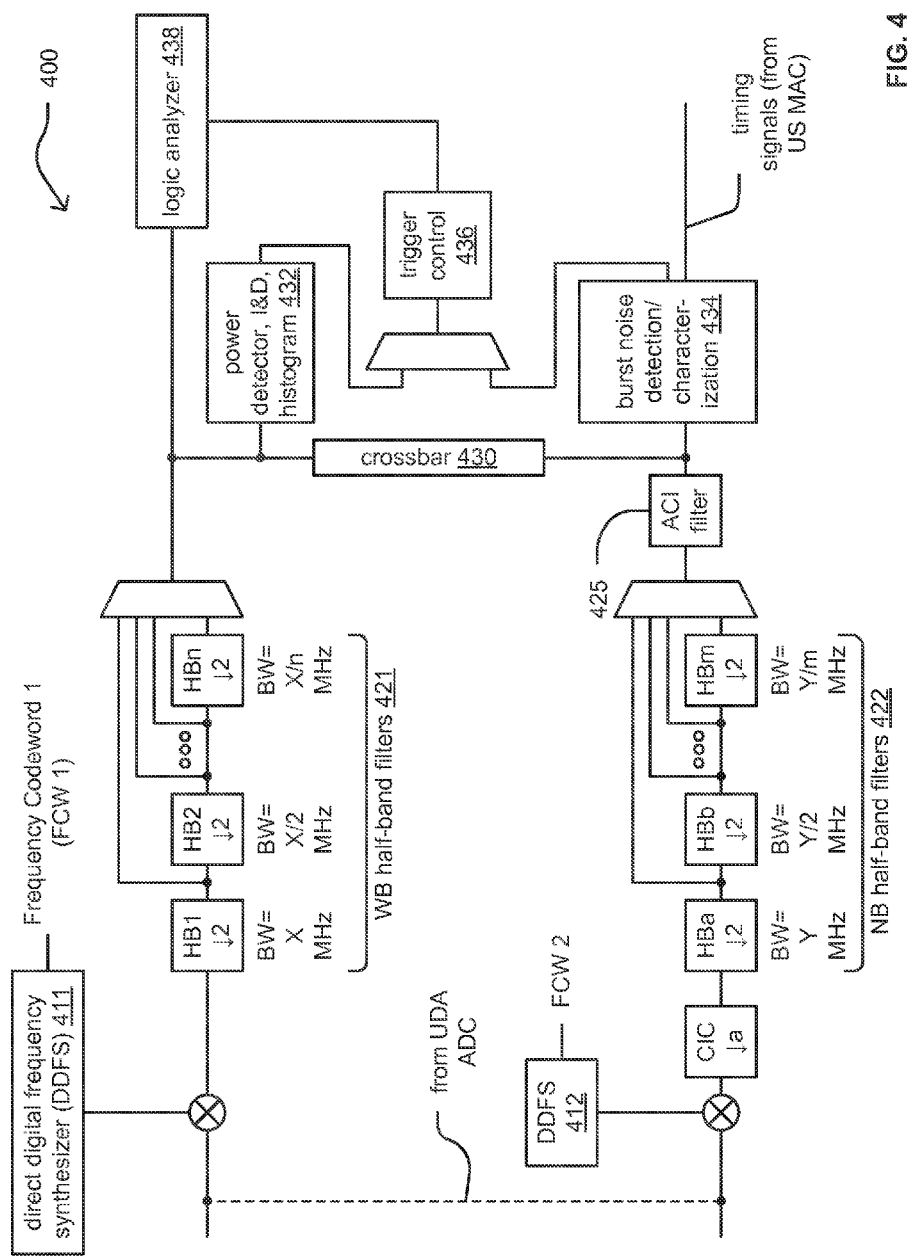
FIG. 4 is a diagram illustrating an example of a channelizer implemented within a CD.

Two complex channelizers: narrowband for burst detector and wideband for sample capture (e.g., see FIG. 4 as an example).

In some examples, the burst event counter 352, which can be implemented to perform narrowband burst detection and event counting, is based on similar hardware implemented in CMTS circuitry to permit consistent measurements at the CM and the CMTS. For example, the input may be decimated samples covering a narrow bandwidth up to some frequency (e.g., 10.24 MHz). The center frequency may be adjustable and agile with a typical default below some particular value (e.g., 10 MHz). The burst event counter 352 detects power that is greater than some threshold, measures average power or amplitude, duration and timestamp of a burst event, and stores last number (e.g., 1024) of signal sample measurements in a ring buffer. The burst event counter 352 may be implemented to synchronize burst detectors in multiple CMs so they will capture the same events. The burst event counter 352 may be implemented to start or stop the ring buffer on a timestamp value, or on a threshold crossing after a timestamp value has occurred; thus multiple CMs will start their ring buffers simultaneously. Note also that the input may be normalized based on AFE gain and transmit (TX) gain.

FIG. 3B is a diagram illustrating an example 302 of integrated-power histogram generation functionality. This functionality may be viewed as that which is provided by histogram 353 in FIG. 3A. As shown in the diagram, the wideband (WB) channelizer 371 or narrowband (NB) channelizer 372 is routed, based on a selector 375, to a power detector ($I^2+Q^2$) 380 and then to an integrate-and-dump (I&D) 385 with programmable integration period (e.g., 1 µs to 50 µs). The output may be converted to a logarithm with ¼ dB resolution (convert to dB 390), then added to a histogram 395 with a certain number (e.g., 512) of bins. The operation of the histogram can be restricted to operate with or without transmission being active from a CD, and/or during active or quiet mode. The I&D 385 can be synchronized with the US transmit signal so that the integration is aligned with the transmitted OFDM/A symbols (details of such OFDM/A symbols are provided below).

With respect to performing wideband sample capture and buffering (e.g., based on the WB channelizer 371), note that input provided thereto is raw ADC or decimated samples covering full upstream band, with sample rate depending on selected diplexer split and is able to direct memory access (DMA) into double data rate (DDR) memory at some desired sample rate or lower. This can preferably be performed to include diplexer rolloff regions (e.g., 0-5 MHz at low end and above 42 MHz, etc., at high end). In some examples, it may be acceptable to capture some negative frequencies (image) to reduce filtering requirements in CM. Another CD (e.g., PNM server) can be operative to remove the image. Also, this wideband sample capture and buffering can synchronize capture in multiple CMs so they will acquire the same events (e.g., start capture beginning on a timestamp value).

There are various modes for triggering how and when certain sample captures occur. Some examples are provided below of trigger modes for WB or NB sample capture:

1. WB level triggered: Trigger when wideband burst detector sees (detects) an event. The burst detector can trigger on a single sample above a programmable threshold, or it may further qualify a burst noise event based on duration above threshold.

2. NB level triggered: Trigger when narrowband burst detector sees an event. Due to the fact that the latency in the NB channelizers is greater than the latency in the WB channelizer due to the difference in bandwidth between the two channelizers, there may be a limitation on where in the buffer the trigger can be placed.

3. Clip triggered: Trigger on clip detection (e.g., a logical combination such as the logical OR of clip detectors at various locations such as ADC output, NB channelizer, WB channelizer).

4. US probe triggered: Trigger when a MAC timing signal (indicating an event such as an active or quiet probe time) occurs.

5. Timestamp triggered: Trigger when a specified timestamp value occurs.

6. Software or control signal/instruction triggered: Capture whenever enabled or commanded by a processor instruction (e.g., such as by software operating on the processor).

Note that if any of a number of various Boolean combinations of the above trigger conditions can be configured (e.g., using Boolean operators such as AND, OR, XOR, etc.). For example, trigger when the timestamp has occurred AND WB threshold exceeded. Alternatively, trigger when during active/quiet probe AND WB threshold exceeded.

In some examples, the AND of all trigger conditions selected produces the final trigger for a sample capture. Each trigger condition or its inverse can be enabled individually into the AND gate. The capture may then be qualified to occur (a) when the CD is transmitting or (b) when the CD is not transmitting. The capture can also be qualified to occur only during an upstream probe. In addition, the ADC output can be gated with control of whether or not the CD is enabled to transmit or not (e.g., TxEnable or TxEnableNot).

With respect to operations performed pre- and post-trigger, the CD may be implemented continuously to store samples in the memory (capture buffer) & fast Fourier transform (FFT) 355, which may be configured as a ring buffer. When the trigger occurs, the memory (capture buffer) & fast Fourier transform (FFT) 355 continues to capture for a programmable number of samples and then stops, resulting in samples in the buffer before and after the trigger, with the trigger at any desired location in the buffer (pre-triggering or post-triggering). The buffer size is configurable (e.g., 32 kB (8 K complex samples, 16 bits each I and Q), shared with other PNM measurements). Raw samples in the memory (capture buffer) & fast Fourier transform (FFT) 355 are then sent to another CD (e.g., PNM server) on request. Samples are also made available for FFT processing in the CD or external to the CD. The timestamp of the trigger, as well as other parameters describing the conditions of the capture, are reported along with the captured data. Various methods, algorithms, and/or processes may be executed within the CD to pre-process the data such as comparing the spectrum to established limits.

With respect to such FFT processing, note that such FFT processing can be performed by UDA circuitry, capability, etc. in a CD. Any of above sample capture modes may be used to capture data for FFT. Some examples of spectrum traces are provided below:

1. Min-hold: Replace contents of any FFT bin with a lower-powered value if it arrives. Some averaging may be done before the 'min' function to prevent deep nulls from dominating.

2. Max-hold: Replace contents of any bin with a higher-powered value if it arrives. Some examples may use some averaging before max-hold function.

3. Mean: Provides spectrum averaging over multiple captures. The device may be configured to perform averaging computations and may preferably use the true power ($I^2+Q^2$ of FFT bin), not usually the dB values, as input to the device performing the averaging. This time averaging may be implemented using a leaky integrator with time constant in powers of 2 from 1 to 4096 spectra. When starting a new measurement, the integrator may be initialized with the first spectrum (e.g., instead of zeroes).

4. Software FFT qualify: Take FFT and discard (that is, do not include in average or display) those spectra not meeting a desired criterion such having energy above threshold in a band of interest for burst noise (e.g., 5-7 MHz).

Any desired operational parameters of such FFT may be used including various types of window and various FFT lengths. For example, an FFT window such as rectangular (e.g., which may be selected as a default), Hanning, etc., and an FFT length may be selected to include others to match an US CD (e.g., CMTS). A rectangular window may be preferred for bursty signals which are not centered in the window. With respect to FFT length, some examples operate based on powers of 2 from 256 to 4096 to match the US CD (e.g., CMTS). If the FFT length is less than the capture length, an average of multiple spectra which uses all, nearly all, or some number of, captured samples can be employed.

FIG. 4 is a diagram illustrating an example of a channelizer 400 implemented within a CD. The signal provided to the channelizer 400 may be viewed as being tapped off or provided from the output of a power amplifier (PA) for the upstream (US) port of a diplexer or other desired sample point within a CD (e.g., cable modem). The channelizer 400 may be configured to assist in sample capture of a signal based on wideband (WB) and/or narrowband (NB) considerations (or alternatively fullband (FB) and/or subset of FB considerations). The WB channelizer is intended to capture essentially the full bandwidth of the signal under analysis, such as burst noise. For example, a set of WB half-band filters 421 may be implemented to assist in the sample capture using any of a number of selected frequency ranges, bands, etc. In some examples, the set of WB half-band filters 421 may vary in frequency range from X=200 MHz, to X/2=100 MHz, and so on to X/n=25 MHz. Generally speaking, any desired WB frequency range may be serviced using the set of WB half-band filters 421.

Similarly, a set of NB half-band filters 422 may be implemented to assist in the sample capture using any of a number of selected frequency ranges, bands, etc. The NB channelizer is intended to capture a smaller slice of bandwidth, while eliminating other signals such as STB transmissions and the transmissions from the same CD containing the UDA. In some examples, the set of NB half-band filters 422 may vary in frequency range from Y=10.24 MHz, to Y/2=5.12 MHz, and so on to Y/M=1.28 MHz. Generally speaking, any desired WB frequency range may be serviced using the set of NB half-band filters 422.

The signal that is to be sampled is provided to one or both of the set of WB half-band filters 421 and the set of NB half-band filters 422. Within the WB chain, a direct digital frequency synthesizer (DDFS) 411 mixes or frequency shifts the signal based on a frequency codeword 1 (FCW 1), and the processed signal output therefrom is provided to the WB half-band filters 421. Similarly, within the NB chain, a DDFS 412 mixes or frequency shifts the signal based on a FCW 2, and the processed signal output therefrom is provided to the set of NB half-band filters 422.

Any desired frequency range within the various bandwidth, ranges, etc. serviced by the set of WB half-band filters 421 and the set of NB half-band filters 422 may be selected. This allows great adaptability and selectivity of which portion or portions of the frequency spectrum may be sampled at any given time and for various purposes. An adjacent channel interference (ACI) filter 425 may be implemented to process the output from the set of NB half-band filters 422. Also, a crossbar 430 may be implemented to provide signals between the WB and NB chains.

The power detector, integrate-and-dump (I&D), and histogram 432 is implemented to receive one or both of the outputs from the WB and NB chains. Similarly, burst noise detection, characterization 434 may be performed based on one or both of the outputs from the WB and NB chains. The burst noise detection, characterization 434 may be configured to receive timing signals, such as from an upstream media access control (MAC) of another CD. Trigger control 436 may be configured to initiate sample capture based on any combination (e.g., any Boolean combination) of a number of trigger criteria as described herein. A logic analyzer 438 allows trigger placement to be made anywhere in capture memory. An interrupt may be made upon completion of the sample capture (e.g., such as when the memory is full).

In certain applications, various communication devices support communications based on (OFDM) and/or orthogonal frequency division multiple access (OFDMA). In some examples, communication devices as described herein are performed in accordance with various versions of Data Over Cable Service Interface Specification (DOCSIS) including DOCSIS 3.1. As such, a description of OFDM/OFDMA is provided below.

Figure 5:
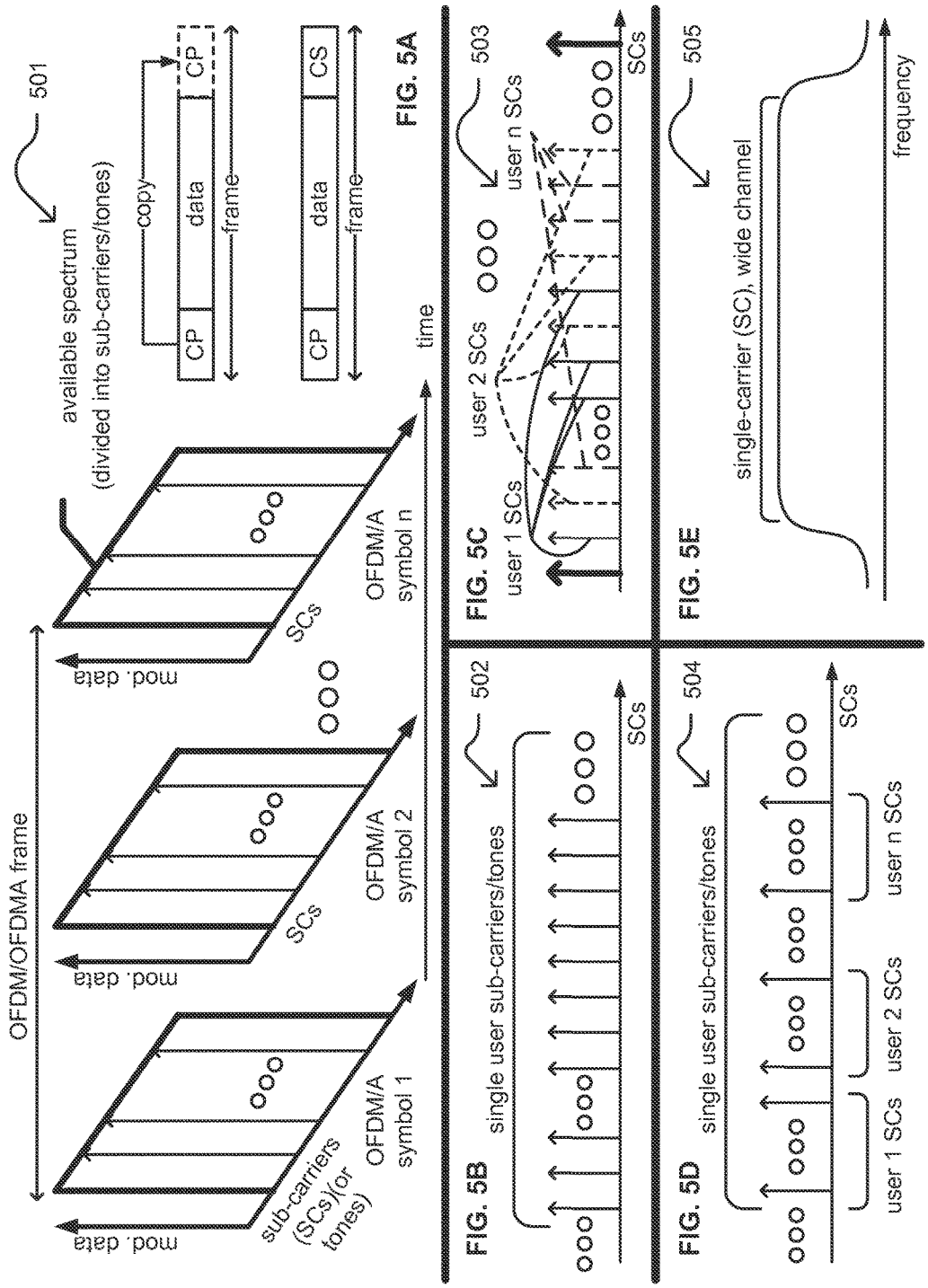
FIG. 5A is a diagram illustrating an example of orthogonal frequency division multiplexing (OFDM) and/or orthogonal frequency division multiple access (OFDMA).
FIG. 5B is a diagram illustrating another example of OFDM and/or OFDMA.
FIG. 5C is a diagram illustrating another example of OFDM and/or OFDMA.
FIG. 5D is a diagram illustrating another example of OFDM and/or OFDMA.
FIG. 5E is a diagram illustrating an example of single-carrier (SC) signaling.

FIG. 5A is a diagram illustrating an example 501 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Note that sub-carrier or tone may be used interchangeably. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processor and the communication interface of a communication device may be configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 4096 QAM, etc.).

FIG. 5B is a diagram illustrating another example 502 of OFDM and/or OFDMA. A transmitting device transmits modulation symbols via the sub-carriers. OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a cyclic prefix (CP) and/or cyclic suffix (CS) (shown in right hand side of FIG. 5A) that may be a copy of the CP may also be employed within the guard interval to allow switching time (e.g., such as when jumping to a new communication channel or sub-channel) and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 5C.

FIG. 5C is a diagram illustrating another example 503 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of sub-carriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 5C shows example 503 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 5D is a diagram illustrating another example 504 of OFDM and/or OFDMA. In this example 504, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

FIG. 5E is a diagram illustrating an example 505 of single-carrier (SC) signaling. SC signaling, when compared to OFDM signaling, includes a singular relatively wide channel across which signals are transmitted. In contrast, in OFDM, multiple narrowband sub-carriers or narrowband sub-channels span the available frequency range, bandwidth, or spectrum across which signals are transmitted within the narrowband sub-carriers or narrowband sub-channels.

Generally, a communication device may be configured to include a processor and the communication interface configured to process received OFDM or OFDMA symbols and/or frames (and/or SC symbols and/or frames) and to generate such OFDM or OFDMA symbols and/or frames (and/or SC symbols and/or frames).

Figure 6:
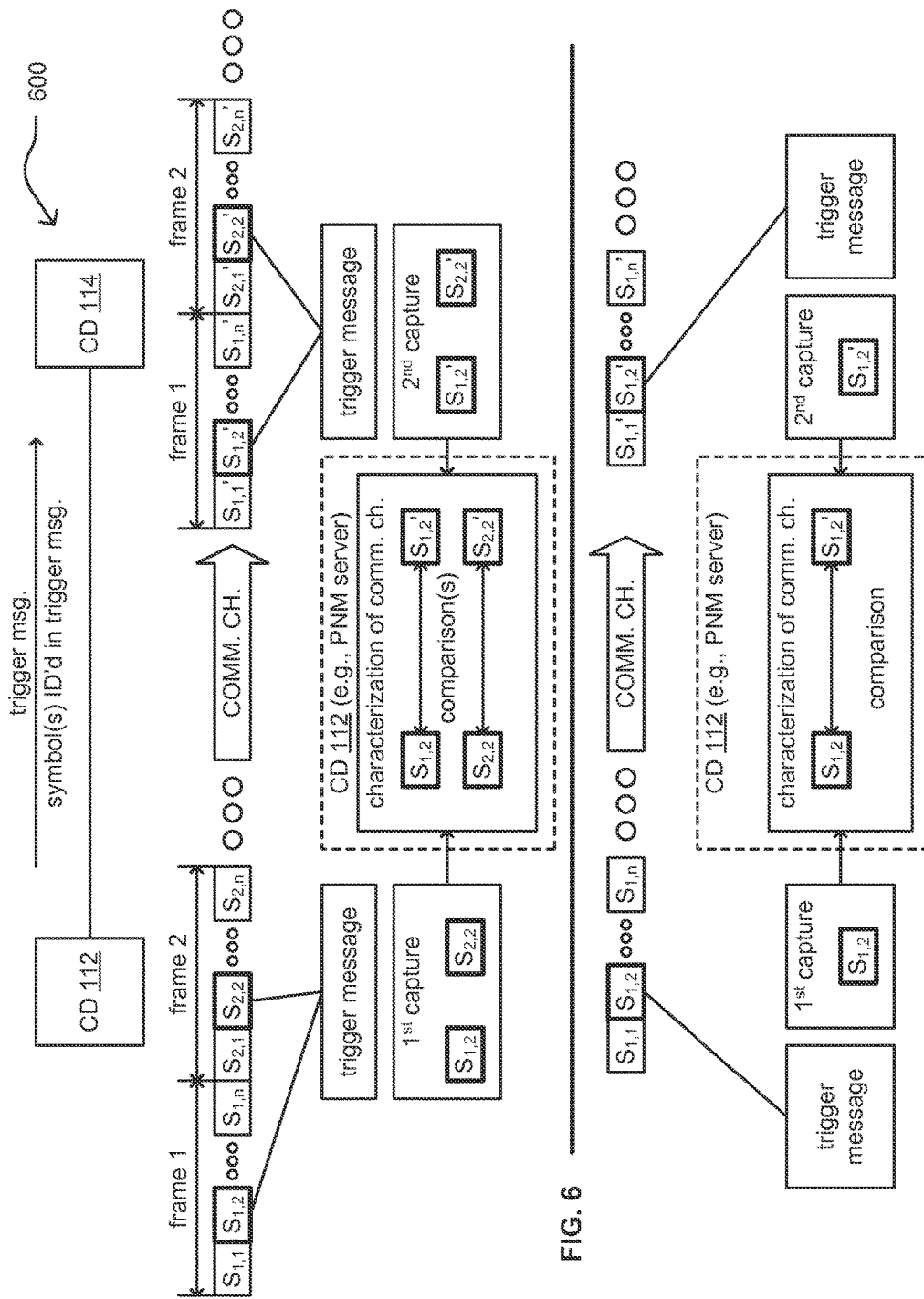
FIG. 6 is a diagram illustrating an example of synchronization of an event at different CDs.

FIG. 6 is a diagram illustrating an example 600 of synchronization of an event at different CDs. In this diagram, device 112 transmits a trigger message to device 114. In some examples, the trigger message identifies one or more symbols in the OFDM/A stream, and in other examples the trigger message may consist of a timestamp. Note that while many examples herein are described in terms of one or more OFDM symbols being identified within the trigger message, any types of symbols and/or any types of signals may be identified within the trigger message transmitted between devices. Then, the captures based on those symbols and/or signals transmitted between devices subsequent to the transmission of the trigger message (e.g., a first capture performed before transmission and a second capture performed after receipt in a receiver device) allows for a characterization of the communication pathway along which those symbols and/or signals have been transmitted. In addition, events such as burst noise may be captured at the same time by multiple CDs, allowing the PNM server to compare and correlate the same event seen at different locations in the cable plant. Since burst noise occurs at random times, several attempts may be needed before a valid capture of burst noise is achieved. Also, by combining timestamp enable with threshold triggering, multiple devices may capture the same event.

In the top portion of this diagram, a trigger message that is transmitted from device 112 to device 114 specifies symbol $S_{1,2}$ in a frame 1 and symbol $S_{2,2}$ in a frame 2. In other examples, only one symbol within one or more frames may be specified by the trigger message. The device 112 performs a first capture of those symbols before or during their transmission to device 114. The device 114 receives the trigger message and then subsequently receives a transmission that includes the one or more symbols identified by the trigger message. The device 114 performs a capture of those symbols identified within the trigger message. When these symbols are affected by one or more channel effects (e.g., noise, interference, distortion, etc.) then the symbols captured by device 114 will be modified, at least somewhat, compared to the symbols before their transmission from device 112. For example, if device 112 generates a trigger message that it identifies $S_{1,2}$ in a frame 1 and symbol $S_{2,2}$, then device 114 will perform capture of symbols at those locations, but they may be slightly modified, as shown by the prime in the diagram (e.g., $S_{1,2}'$ and symbol $S_{2,2}'$ as shown within a second capture performed by device 114).

In one example, the symbol or symbols captured are upstream probe symbols. In this case, the content of the probe symbol is known to the receiver since the probe contains known data. With known data at the input and output of the channel, the channel response (linear and nonlinear) may be solved for using techniques of system identification. In another example, the signal captured does not consist of transmitted symbols, but samples of burst noise. If the captured burst noise signal is observed at multiple points in the cable plant, the comparison of the signals from the various points gives information about the channel response between the capture points, as well as the likely physical location of the source of the noise.

In the bottom portion of this diagram, a trigger message that is transmitted from device 112 to device 114 specifies symbol $S_{1,2}$ to be transmitted. The device 112 performs a first capture of that specified symbol $S_{1,2}$ before or during its transmission to device 114. The device 114 receives the trigger message and then subsequently receives a transmission that includes the symbol $S_{1,2}$ identified by the trigger message. The device 114 performs a capture of symbol $S_{1,2}$ identified within the trigger message. When symbol $S_{1,2}$ is affected by one or more channel effects (e.g., noise, interference, distortion, etc.) then the symbol $S_{1,2}$ captured by device 114 will be modified, at least somewhat, compared to the symbols before their transmission from device 112. For example, if device 112 generates a trigger message that it identifies $S_{1,2}$, then device 114 will perform capture of the symbol at that location, but they may be slightly modified, as shown by the prime in the diagram (e.g., $S_{1,2}'$ as shown within a second capture performed by device 114). This example of the bottom portion of this diagram shows use of such trigger message functionality without any formal framing structure.

Any device that has access to both the first and second capture can perform characterization of the communication channel between device 112 and device 114. For example, when device 114 receives the first capture from device 112, then device 114 can determine a characterization of the communication channel between devices 112 and 114. In another example, when device 112 receives the second capture from device 114, then device 112 can determine a characterization of the communication channel between devices 112 and 114. In yet another example, another device not shown in the diagram that receives both the first and second captures can perform a characterization of the communication channel between devices 112 and 114.

Generally speaking, any types of symbols and/or signals may be identified within a trigger message and captures based thereon may be used to characterize a communication pathway along which those symbols and/or signals are transmitted. Orthogonal frequency division multiplexing (OFDM) symbols, including known probe symbols, are one possible type of signal that may be used for these purposes and some details are described below. Burst noise signals are a second possible type of signal that may be used for these purposes.

Figure 7:
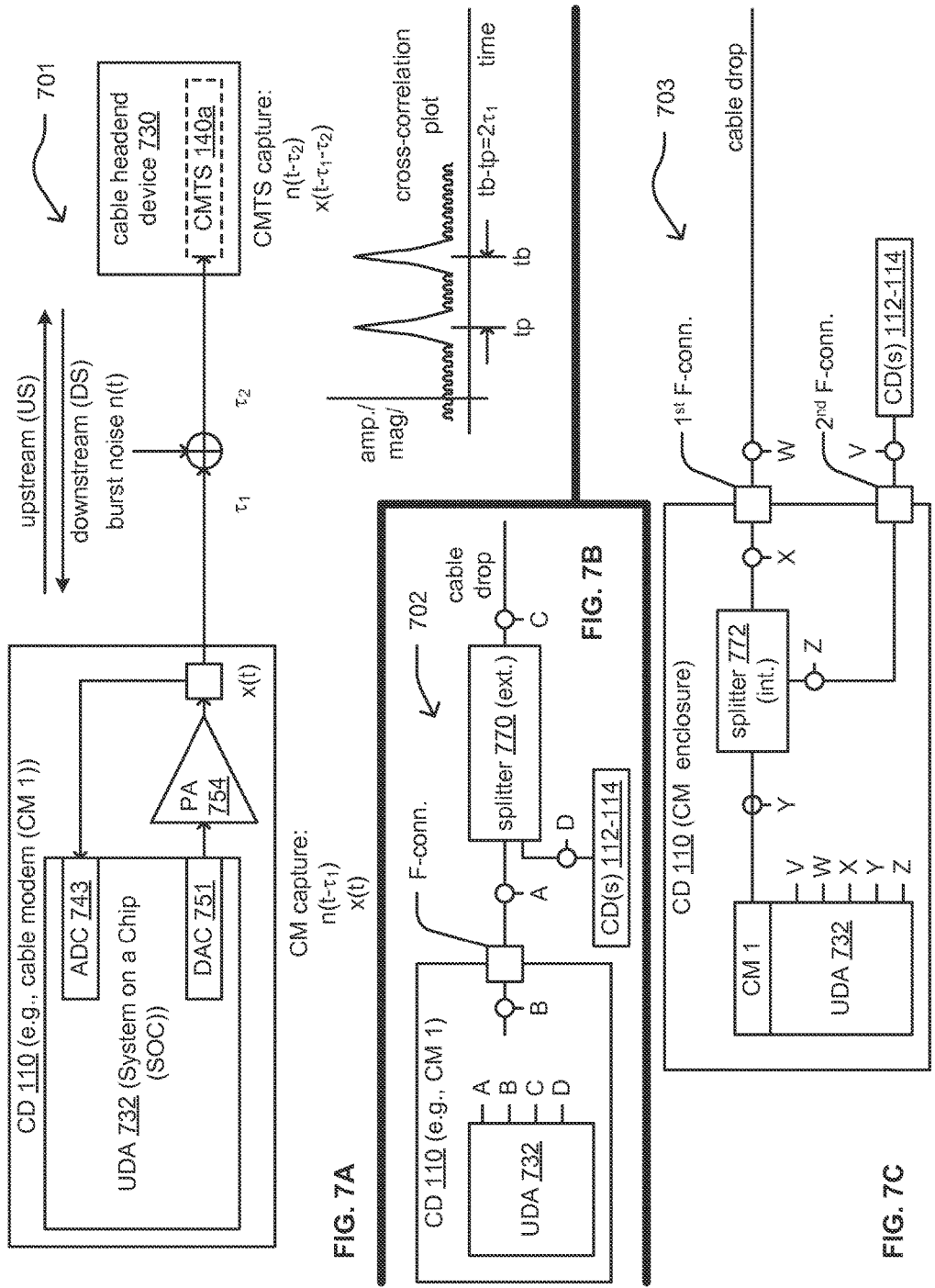
FIG. 7A is a diagram illustrating another example of other communication devices operative within one or more communication systems.
FIG. 7B is a diagram illustrating example of a CD that includes an upstream diagnostic analyzer (UDA).
FIG. 7C is a diagram illustrating example of a CD that includes an UDA.

FIG. 7A is a diagram illustrating another example 701 of other communication devices operative within one or more communication systems. In the following diagram, the example 701 shows communication US and DS between a CD 110 and cable headend device 730 (e.g., such as cable headend transmitter 130 of FIG. 1B), which may include a CMTS 140a therein such as described with reference to FIG. 1B. Generally, the CD 110 and the cable headend device 730 may be viewed as being any types of communication devices in alternative examples.

In the following diagram, x(t) is the upstream probe signal sent by the CD 110, and n(t) is the burst noise inserted into the cable at a location outside the CD 110. The location of the insertion point of n(t) is to be solved for. The time delay along the cable from the CD 110 to the noise insertion point is tau1 ($\tau_1$) The time delay from the noise insertion point to the CMTS is tau2 ($\tau_2$).

The probe signal from the CD 110 arrives at the UDA (e.g., located in the CD 110 in this example) virtually instantly, so the UDA sees the probe signal x(t) essentially unmodified. Note that the UDA 732 may be implemented as a system-on-a-chip (SOC) that includes both a DAC 751 that generates an analog or continuous-time signal that is provided to a PA 754 to generate an amplified analog or continuous-time signal for transmission to the cable headend device 730. The UDA 732 also includes an ADC 743 configured to perform sample capture of the amplified analog or continuous-time signal output from the PA 754.

Note that other examples can include the UDA in the cable headend device 730, in any other communication device in the communication system, etc. The same probe signal experiences delay tau1+tau2 or ($\tau_1+\tau_2$) traversing the cable plant so the cable headend device 730 sees the delayed probe signal x(t−tau1−tau2) or x(t−$\tau_1$−$\tau_2$). Similarly for the noise components, the UDA sees or detects the burst noise delayed by tau1, or n(t−tau1) or n(t−$\tau_1$), while the cable headend device 730 sees n(t−tau2) or n(t−$\tau_2$). Hence the UDA captures y1=x(t)+n(t−tau1) or y1=x(t)+n(t−$\tau_1$) and the cable headend device 730 captures y2=x(t−tau1−tau2)+n(t−tau2) or y2=x(t−$\tau_1$−$\tau_2$)+n(t−$\tau_2$).

The PNM server can be configured to cross-correlate the captures from the CD 110 and cable headend device 730, that is, y1 and y2. Generally, any device including such PNM functionality can be configured to cross-correlate the captures from two communication devices at opposite ends of a communication link or pathway (e.g., y1 and y2). Generally, the CD 110 in this diagram may be viewed as a first communication device, and the cable headend device 730 in this diagram may be viewed as a second communication device at opposite ends of a communication link or pathway.

In this example, there may be two peaks in the magnitude of this cross-correlation function: (1) one corresponding to the burst noise n, and (2) another one corresponding to the probe signal x. The cross-correlation peak for the probe signal occurs at offset tp=(t−tau1)−(t−tau2)=tau2−tau1 or tp=(t−$\tau_1$)−(t−$\tau_2$)=$\tau_2$−$\tau_1$.

The cross-correlation peak for the burst noise signal occurs at offset tb=t−(t−tau1−tau2)=tau1+tau2 or tb=t−(t−$\tau_1$−$\tau_2$)=$\tau_1$+$\tau_2$. The difference tb−tp=2×$\tau_1$, so a device may be configured to solve for the desired quantity tau1=(tb−tp)/2 or $\tau_1$=(tb−tp)/2. Knowing the propagation velocity and/or physical layout of in the cable, this calculation gives the distance from the CD 110 to the point where the burst noise is entering the cable (e.g., where n(t) is entering the cable between the CD 110 and the cable headend device 730), which is the desired measurement. In other configurations, such as where the noise source is within the home, similar equations can be developed.

FIG. 7B is a diagram illustrating example 702 of a CD that includes an upstream diagnostic analyzer (UDA). In this diagram, a CD 110 (e.g., CM 1) includes an F-connector. Note that an F-connector is a coaxial RF connector commonly used for "over the air" terrestrial television, cable television and universally for satellite television and cable modems, usually with RG-6/U cable or, in older installations, with RG-59/U cable. Note that any other type of connector may be used in various applications.

The CD 110 also includes circuitry, components, elements, etc. to perform and support functionality of upstream diagnostic analyzer (UDA) 732. A splitter 770 is implemented externally to and separate from CD 110. The splitter 770 receives the cable drop, and splitter also provides an output port to one or more other CDs 112-114, which may be located in the customer premises, such as a home. The UDA 732 is configured to perform sample capture of various signals at different locations within this configuration as shown by the letters A, B, C, and D. For example, the UDA can perform sample capture of signals on either side of the F-connector including the port of the splitter 770 that is connected or coupled to the F-connector of the CD 110. Also, the UDA 732 may be configured to perform sample capture of any signal on the port of the splitter 770 that is connected or coupled to the cable drop.

FIG. 7C is a diagram illustrating example 703 of a CD that includes an UDA. In this diagram, the CD 110 (e.g., a CM enclosure) includes first circuitry, components, elements, etc. that perform and support functionality of cable modem (CM 1) and second circuitry, components, elements, etc. that perform and support functionality of upstream diagnostic analyzer (UDA) 732. In this architecture, such CM 1 and UDA 732 may be viewed as being two separate implementations of circuitry, components, elements, etc.

In this architecture, a splitter 772 is implemented internally to the CD 110 (e.g., a CM enclosure). A $1^{st}$ F-connector is connected or coupled to the cable drop and to provide a signal to the internally implemented splitter 772. One output port of the splitter 772 is provided to a $2^{nd}$ F-connector that is connected or coupled to one or more other CDs 112-114. The UDA 732 is configured to perform sample capture of various signals at different locations within this configuration as shown by the letters V, W, X, Y, and Z.

Generally speaking, as can be seen with respect to FIGS. 7B and 7C, different CDs may be implemented based on different topologies and architectures, and UDA 732 may be implemented to perform sample capture of signals at any of a number of various locations. Various implementation's that allow for sample capture at various locations will permit the capturing of noise, interference, etc. that may be incurred in any of a number of locations. Note also that a splitter (e.g., or diplexer if implemented in certain alternative apologies architectures) can incur certain isolation between ports and attenuation. When the UDA 732 is able to perform sample capture and the various locations, better information that provides greater visibility may be acquired for use in characterizing various communication channels, pathways, etc. within the communication system.

Figure 8:
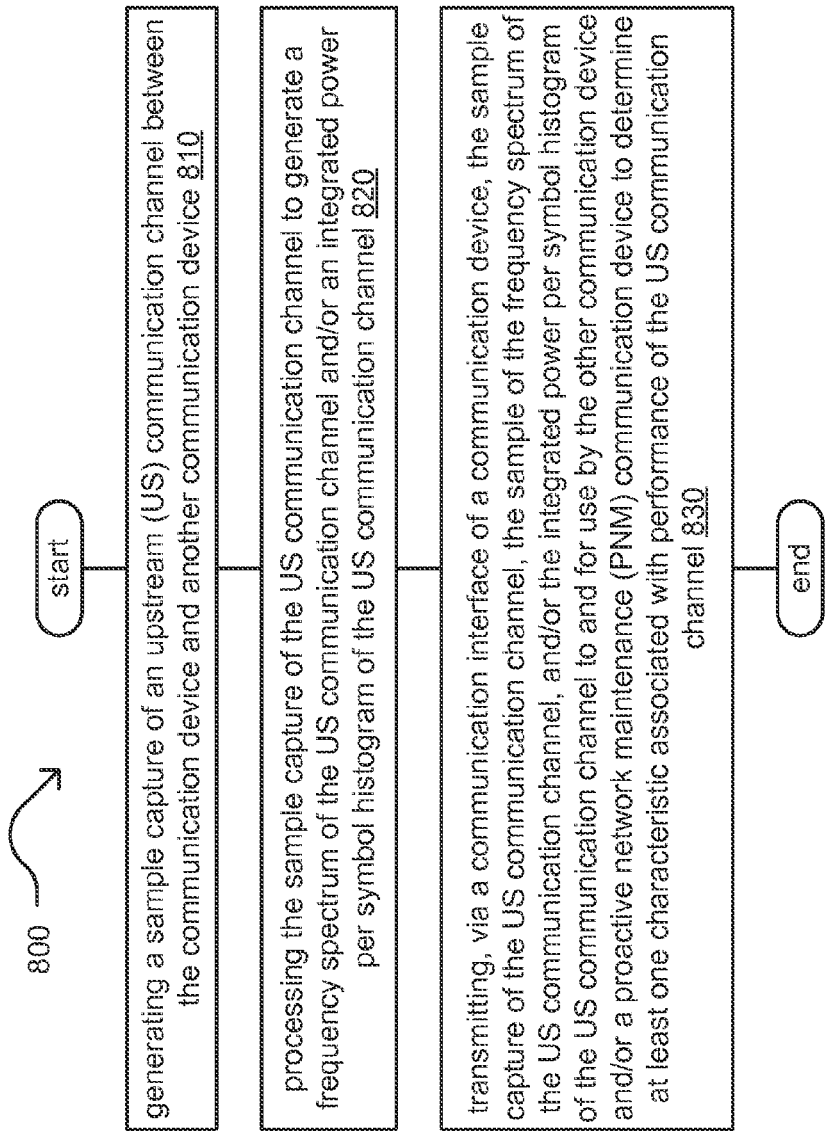
FIG. 8 is a diagram illustrating an embodiment of a method for execution by one or more communication devices.

FIG. 8 is a diagram illustrating an embodiment of a method 800 for execution by one or more communication devices. The method 800 begins by generating a sample capture of an upstream (US) communication channel between the communication device and another communication device (block 810). The method 800 continues by processing the sample capture of the US communication channel to generate a sample of a frequency spectrum of the US communication channel and/or an integrated power per symbol histogram of the US communication channel (block 820).

The method 800 continues by transmitting, via a communication interface of a communication device, the sample capture of the US communication channel, the sample of the frequency spectrum of the US communication channel, and/or the integrated power per symbol histogram of the US communication channel to and for use by at least one of the another communication device or a proactive network maintenance (PNM) communication device to determine at least one characteristic associated with performance of the US communication channel (block 830).

FIG. 9A is a diagram illustrating an embodiment of a method 901 for execution by one or more communication devices. The method 901 begins by processing a first signal using a digital to analog converter (DAC) to generate a second signal (block 911). The method 901 begins by processing the second signal using a power amplifier (PA) to generate a third signal (block 921). The method 901 begins by generating, based on an output node of the PA, a sample capture of a frequency spectrum of an upstream (US) communication channel between the communication device and another communication device (block 931). The method 901 begins by transmitting, via a communication interface of the communication device, the third signal to the other communication device (block 941). The method 901 begins by transmitting, via the communication interface of the communication device, the sample capture to and for use by the other communication device and/or a proactive network maintenance (PNM) communication device to determine at least one characteristic associated with performance of the US communication channel (block 951).

FIG. 9B is a diagram illustrating another embodiment of a method 902 for execution by one or more communication devices. The method 902 begins by generating a first signal and a control signal that includes an instruction for performing a sample capture (block 912). The method 902 continues by processing the first signal using a digital to analog converter (DAC) to generate a second signal (block 922). The method 902 then operates by processing the second signal using a power amplifier (PA) to generate third signal (block 932). The method 902 continues by transmitting, via a communication interface of the communication device, the third signal to another communication device (block 942).

The method 902 then branches depending on the control signal and the instruction therein (per the decision block 952). When the control signal includes an instruction to perform a fullband (FB) sample (per the decision block 952), the method 902 then operates by sampling the third signal based on a fullband sample capture corresponding to a full bandwidth of a usable frequency spectrum of an upstream (US) communication channel between the communication device and the other communication device to generate a fullband signal capture (block 962). When the control signal includes an instruction to perform a subset sample capture (per the decision block 952), the method 902 then operates by sampling the third signal based on a subset sample capture corresponding to a subset bandwidth of the usable frequency spectrum of the US communication channel between the communication device and the other communication device to generate a subset signal capture (block 972).

The method 902 continues by transmitting, via the communication interface of the communication device, the fullband signal capture and/or the subset signal capture to and for use by the other communication device and/or a proactive network maintenance (PNM) communication device to determine at least one characteristic associated with performance of the US communication channel (block 982).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A communication device comprising:
    a diagnostic analyzer configured to:
        generate a sample capture of an upstream (US) communication channel between the communication device and another communication device;
        process the sample capture of the US communication channel to generate at least one of a sample of a frequency spectrum of the US communication channel or an integrated power per symbol histogram of the US communication channel;
        receive a first signal from a communication interface when the communication interface is transmitting a second signal to the another communication device; and
        process the first signal based on at least one of attenuating the first signal or canceling at least a portion of the second signal from the first signal to generate the sample capture of the US communication channel; and
    the communication interface configured to transmit at least one of the sample capture of the US communication channel, the sample of the frequency spectrum of the US communication channel, or the integrated power per symbol histogram of the US communication channel to and for use to be processed by at least one of the another communication device or a proactive network maintenance (PNM) communication device to determine at least one characteristic associated with performance of the US communication channel.

2. The communication device of claim 1 further comprising:
    a processor configured to generate a first signal;
    a digital to analog converter (DAC) configured to process the first signal to generate a second signal;
    a power amplifier (PA) that is coupled or connected to the DAC and configured to process the second signal to generate a third signal;

the diagnostic analyzer configured to generate, based on an output node of the PA, the sample capture of the US communication channel; and the communication interface configured to transmit the third signal to the another communication device.

3. The communication device of claim 1 further comprising:

the diagnostic analyzer configured to:
generate the sample capture of the US communication channel when the communication interface is transmitting a signal to the another communication device;
generate another sample capture of the US communication channel when the communication interface is not transmitting any signal to the another communication device; and
process the another sample capture of the US communication channel to generate a first other sample of the frequency spectrum of the US communication channel or a second other sample of another frequency spectrum of the US communication channel; and the communication interface configured to transmit at least one of the another sample capture of the US communication channel, the first other sample of the frequency spectrum of the US communication channel, or the second other sample of the another frequency spectrum of the US communication channel to and for use to be processed by the at least one of the another communication device or the PNM communication device to determine the at least one characteristic associated with performance of the US communication channel.

4. The communication device of claim 1 further comprising:
a cable modem, wherein the another communication device includes a cable headend transmitter or a cable modem termination system (CMTS).

5. The communication device of claim 1 further comprising:
the diagnostic analyzer configured to:
generate a first sample capture of a fullband frequency spectrum of the US communication channel; and
generate a second sample capture of a subset of the fullband frequency spectrum of the US communication channel; and
the communication interface configured to transmit at least one of the first sample capture or the second sample capture to and for use to be processed by the at least one of the another communication device or the PNM communication device to determine another at least one characteristic associated with performance of the US communication channel.

6. The communication device of claim 1, wherein the diagnostic analyzer is further configured to:
generate the sample capture of the US communication channel based on at least one trigger condition that includes at least one of a first timestamp received from the another communication device, a second timestamp received from the PNM communication device, an energy threshold, a power threshold, a first control signal received from the another communication device, a second control signal received from the PNM communication device, or a detection of at least one of a burst noise event or a clipping event associated with the US communication channel.

7. The communication device of claim 1, wherein the communication interface is further configured to:
support communications within at least one of a satellite communication system, a wireless communication system, a wired communication system, a fiber-optic communication system, or a mobile communication system.

8. A communication device comprising:
a communication interface; and
a processor, at least one of the processor or the communication interface configured to:
support communication with another communication device;
receive at least one of a sample capture of an upstream (US) communication channel between the communication device and another communication device, a sample of a frequency spectrum of the US communication channel that is based on the sample capture of the US communication channel, or an integrated power per symbol histogram of the US communication channel, wherein the another communication device includes a diagnostic analyzer configured to generate the sample capture of the US communication channel, the sample of the frequency spectrum of the US communication channel, or the integrated power per symbol histogram of the US communication channel received from the another communication device, wherein the another communication device is configured to receive a first signal when the another communication device is transmitting a second signal to the communication device and to process the first signal based on at least one of attenuating the first signal or canceling at least a portion of the second signal from the first signal to generate the sample capture of the US communication channel; and
process the at least one of the sample capture of the US communication channel, the sample of the frequency spectrum of the US communication channel that is based on the sample capture of the US communication channel, or the integrated power per symbol histogram of the US communication channel to determine at least one characteristic associated with performance of the US communication channel between the another communication device and the communication device.

9. The communication device of claim 8, wherein the at least one of the processor or the communication interface is further configured to:
receive a signal from the another communication device;
generate another sample capture based on the signal that is received from another communication device;
receive the at least one of the sample capture of the US communication channel, the sample of the frequency spectrum of the US communication channel, or the integrated power per symbol histogram of the US communication channel, wherein the another communication device includes the diagnostic analyzer configured to generate the sample capture when the another communication device is transmitting the signal to the communication device; and
process the another signal capture and the at least one of the sample capture of the US communication channel, the sample of the frequency spectrum of the US communication channel, or the integrated power per symbol histogram of the US communication channel to determine the at least one characteristic associated with performance of the US communication channel between the another communication device and the communication device.

10. The communication device of claim 8, wherein the at least one of the processor or the communication interface is further configured to:
receive a signal from another communication device;
generate, based on the signal that is received from another communication device, a first sample capture of a fullband frequency spectrum of the US communication channel between the another communication device and the communication device;
generate, based on the signal that is received from another communication device, a second sample capture of a subset of the fullband frequency spectrum of the US communication channel between the another communication device and the communication device; and
process the sample capture and at least one of the first sample capture or the second sample capture to determine another at least one characteristic associated with performance of the US communication channel between the another communication device and the communication device.

11. The communication device of claim 8 further comprising:
a cable headend transmitter or a cable modem termination system (CMTS) that includes proactive network maintenance (PNM) functionality, and wherein the another communication device is a cable modem.

12. The communication device of claim 8, wherein the at least one of the processor or the communication interface is further configured to:
support communications within at least one of a satellite communication system, a wireless communication system, a wired communication system, a fiber-optic communication system, or a mobile communication system.

13. A method for execution by a communication device, the method comprising:
generating a sample capture of an upstream (US) communication channel between the communication device and another communication device;
receiving a first signal from a communication interface of the communication device when the communication interface is transmitting a second signal to the another communication device;
processing the first signal based on at least one of attenuating the first signal or canceling at least a portion of the second signal from the first signal when generating the sample capture of the US communication channel;
processing the sample capture of the US communication channel to generate at least one of a sample of a frequency spectrum of the US communication channel or an integrated power per symbol histogram of the US communication channel; and
transmitting, via the communication interface of the communication device, at least one of the sample capture of the US communication channel, the sample of the frequency spectrum of the US communication channel, or the integrated power per symbol histogram of the US communication channel to and for use to be processed by at least one of the another communication device or a proactive network maintenance (PNM) communication device to determine at least one characteristic associated with performance of the US communication channel.

14. The method of claim 13 further comprising:
processing a first signal using a digital to analog converter (DAC) to generate a second signal;
processing the second signal using a power amplifier (PA) to generate a third signal;
generating, based on an output node of the PA, the sample capture of the US communication channel; and
transmitting, via the communication interface of the communication device, the third signal to the another communication device.

15. The method of claim 13 further comprising:
generating the sample capture of the US communication channel when the communication interface is transmitting a signal to the another communication device;
generating another sample capture of the US communication channel when the communication interface is not transmitting any signal to the another communication device;
processing the another sample capture of the US communication channel to generate a first other sample of the frequency spectrum of the US communication channel or a second other sample of another frequency spectrum of the US communication channel; and
transmitting, via the communication interface of the communication device, at least one of the another sample capture of the US communication channel, the first other sample of the frequency spectrum of the US communication channel, or the second other sample of the another frequency spectrum of the US communication channel to and for use to be processed by the at least one of the another communication device or the PNM communication device to determine the at least one characteristic associated with performance of the US communication channel.

16. The method of claim 13, wherein the communication device includes a cable modem, and the another communication device includes a cable headend transmitter or a cable modem termination system (CMTS).

17. The method of claim 13 further comprising:
generating a first sample capture of a fullband frequency spectrum of the US communication channel;
generating a second sample capture of a subset of the fullband frequency spectrum of the US communication channel; and
transmitting, via the communication interface of the communication device, at least one of the first sample capture or the second sample capture to and for use to be processed by the at least one of the another communication device or the PNM communication device to determine another at least one characteristic associated with performance of the US communication channel.

18. The method of claim 13 further comprising:
generating the sample capture of the US communication channel based on at least one trigger condition that includes at least one of a first timestamp received from the another communication device, a second timestamp received from the PNM communication device, an energy threshold, a power threshold, a first control signal received from the another communication device, a second control signal received from the PNM communication device, or a detection of at least one of a burst noise event or a clipping event associated with the US communication channel.

19. A communication device comprising:
a diagnostic analyzer configured to:
  generate a sample capture of an upstream (US) communication channel between the communication device and another communication device;
  process the sample capture of the US communication channel to generate at least one of a sample of a frequency spectrum of the US communication channel or an integrated power per symbol histogram of the US communication channel; and
  process the sample capture of the US communication channel to generate partially processed information that corresponds to the sample capture of the US communication channel; and
a communication interface configured to:
  transmit at least one of the sample capture of the US communication channel, the sample of the frequency spectrum of the US communication channel, or the integrated power per symbol histogram of the US communication channel to and for use to be processed by at least one of the another communication device or a proactive network maintenance (PNM) communication device to determine at least one characteristic associated with performance of the US communication channel; and
  transmit the partially processed information that corresponds to the sample capture of the US communication channel to and for use to be processed by the at least one of the another communication device or the PNM communication device to complete processing of the partially processed information to generate fully processed information that corresponds to the sample capture of the US communication channel and to determine another at least one characteristic associated with performance of the US communication channel based on the fully processed information.

20. A method for execution by a communication device, the method comprising:
  generating a sample capture of an upstream (US) communication channel between the communication device and another communication device;
  processing the sample capture of the US communication channel to generate at least one of a sample of a frequency spectrum of the US communication channel or an integrated power per symbol histogram of the US communication channel;
  processing the sample capture of the US communication channel to generate partially processed information that corresponds to the sample capture of the US communication channel;
  transmitting, via a communication interface of the communication device, at least one of the sample capture of the US communication channel, the sample of the frequency spectrum of the US communication channel, or the integrated power per symbol histogram of the US communication channel to and for use to be processed by at least one of the another communication device or a proactive network maintenance (PNM) communication device to determine at least one characteristic associated with performance of the US communication channel; and
  transmitting, via the communication interface of the communication device, the partially processed information that corresponds to the sample capture of the US communication channel to and for use to be processed by at least one of the another communication device or the PNM communication device to complete processing of the partially processed information to generate fully processed information that corresponds to the sample capture of the US communication channel and to determine another at least one characteristic associated with performance of the US communication channel based on the fully processed information.

\* \* \* \* \*